(12) United States Patent
Lin et al.

(10) Patent No.: US 11,877,282 B2
(45) Date of Patent: Jan. 16, 2024

(54) GRANT-FREE GF RESOURCE ALLOCATION METHOD AND RELATED DEVICE

(71) Applicant: HUAWEI TECHNOLOGIES CO., LTD., Guangdong (CN)

(72) Inventors: Gaoquan Lin, Shenzhen (CN); Ruiyue Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 369 days.

(21) Appl. No.: 17/159,822

(22) Filed: Jan. 27, 2021

(65) Prior Publication Data

US 2021/0153183 A1 May 20, 2021

Related U.S. Application Data

(63) Continuation of application No. PCT/CN2019/095024, filed on Jul. 8, 2019.

(30) Foreign Application Priority Data

Jul. 28, 2018 (CN) .......................... 201810854876.0

(51) Int. Cl.
H04W 72/20 (2023.01)
(52) U.S. Cl.
CPC .................................. H04W 72/20 (2023.01)
(58) Field of Classification Search
None
See application file for complete search history.

(56) References Cited

U.S. PATENT DOCUMENTS

| 2018/0368205 A1* | 12/2018 | Park | ...................... H04W 76/30 |
| 2020/0178304 A1* | 6/2020 | Chen | ................. H04W 72/0446 |
| 2021/0368494 A1* | 11/2021 | Chen | ..................... H04L 1/0003 |

FOREIGN PATENT DOCUMENTS

| CN | 106507486 A | 3/2017 |
| CN | 108282868 A | 7/2018 |

(Continued)

OTHER PUBLICATIONS

Intel Corporation, "Uplink grant free transmission for URLLC services," 3GPP TSG RAN1 WG Meeting #88, R1-1702242, Athens, Greece, Feb. 13-17, 2017, 7 pages.

(Continued)

*Primary Examiner* — Nguyen H Ngo
(74) *Attorney, Agent, or Firm* — Fish & Richardson P.C.

(57) ABSTRACT

This application provides an example grant-free (GF) resource allocation method and an example related device. The method includes obtaining, by an intelligent management function unit (IMF), feature information of a service. The method also includes determining, by the IMF, GF resource information corresponding to the feature information or GF resource indication information corresponding to the feature information, and sending, by the IMF, the GF resource information or the GF resource indication information to a base station or a management unit of a base station. The GF resource information is used to describe GF resources corresponding to a cell or GF resources corresponding to a network slice, the cell corresponds to the base station, and the network slice corresponds to the base station. The GF resource indication information is used to indicate the base station to determine the GF resource information or the management unit to determine the GF resource information.

9 Claims, 15 Drawing Sheets

(56) References Cited

FOREIGN PATENT DOCUMENTS

| | | |
|---|---|---|
| EP | 3340726 A1 | 6/2018 |
| WO | 2018090861 A1 | 5/2018 |
| WO | 2018127092 A1 | 7/2018 |
| WO | 2018127201 A1 | 7/2018 |

OTHER PUBLICATIONS

PCT International Search Report and Written Opinion issued in International Application No. PCT/CN2019/095024 dated Sep. 26, 2019, 17 pages (with English translation).

Office Action issued in Chinese Application No. 201810854876.0 dated Apr. 22, 2022, 4 pages.

Huawei, HiSilicon, "On multiple resource configuration for UL grant-free transmission," 3GPP TSG RAN WG1 NR Ad-Hoc #3, R1-1715420, Nagoya, Japan, Sep. 18-21, 2017, 6 pages.

Office Action issued in Chinese Application No. 201810854876.0 dated Jul. 20, 2021, 7 pages.

\* cited by examiner

GRANT-FREE GF RESOURCE ALLOCATION METHOD AND RELATED DEVICE

CROSS-REFERENCE TO RELATED APPLICATIONS

This application is a continuation of International Application No. PCT/CN2019/095024, filed on Jul. 8, 2019, which claims priority to Chinese Patent Application No. 201810854876.0, filed on Jul. 28, 2018. The disclosures of the aforementioned applications are hereby incorporated by reference in their entireties.

TECHNICAL FIELD

This application relates to the communications field, and in particular, to a grant-free (GF) resource allocation method and a related device.

BACKGROUND

A low-latency service is an important scenario in a 5th generation (5G) mobile communications technology. When uplink data of a low-latency service is transmitted, grant-free (GF) data uploading needs to be supported. In this way, a time of signaling exchange between "sending a scheduling request by user equipment (UE)" and "sending a resource indication of uplink data transmission to the UE" is reduced, thereby meeting a low-latency indicator requirement.

In an existing solution, GF resource information is manually allocated to a cell or a network slice in advance. The GF resource is used to describe GF resources corresponding to the cell or the network slice, and then the GF resources are delivered to UE that accesses the cell or the network slice via a 5G gNodeB (gNB) corresponding to the cell or the network slice, so that the UE may upload service data on the GF resources based on the GF resource information.

However, there is a disadvantage in the GF resource allocation method in actual application. Because the GF resources corresponding to the cell or the network slice are fixed, if there is a relatively small quantity of UEs or data uploading requirements, a waste of spare GF resources is caused; or if there is a relatively large quantity of UEs or data uploading requirements, pre-allocated GF resources definitely cannot meet all data uploading requirements.

SUMMARY

This application provides a grant-free (GF) resource allocation method and a related device, to properly allocate GF resources.

According to a first aspect of this application, a grant-free (GF) resource allocation method is provided, including: An intelligent management function unit (IMF) obtains feature information of a service; the IMF determines GF resource information corresponding to the feature information or GF resource indication information corresponding to the feature information; and the IMF sends the GF resource information or the GF resource indication information to a base station or a management unit of a base station, where the GF resource information is used to describe GF resources corresponding to a cell or GF resources corresponding to a network slice, the cell corresponds to the base station, and the network slice corresponds to the base station; and the GF resource indication information is used to indicate the base station to determine the GF resource information or indicate the management unit to determine the GF resource information.

In this application, an autonomous learning capability of the IMF is fully used. The IMF obtains the feature information of the service, and may dynamically adjust, by using the feature information, the GF resources corresponding to the cell or the network slice. The IMF sends the GF resource information to the base station or the management unit of the base station, to directly notify the base station or the management unit of the base station of the GF resources corresponding to the cell or the network slice; or the IMF sends the GF resource indication information to the base station or the management unit of the base station, so that the base station or the management unit of the base station actively determines the GF resource information, to indirectly notify the management unit of the base station or the base station of GF resources to be allocated to the cell or the network slice. The setting not only can meet a GF resource requirement of the GF service in the cell or on the network slice, but also can avoid a waste of GF resources in the cell or on the network slice. In this way, proper allocation and dynamic allocation of the GF resources in the cell or on the network slice are implemented.

With reference to the first aspect of this application, in a first possible implementation of the first aspect of this application, the GF resource indication information specifically includes a GF resource allocation model corresponding to the cell or the network slice, and the GF resource allocation model includes GF resources to be allocated in different time periods to all UEs that access the cell or the network slice. The GF resource allocation model is obtained by the IMF based on the feature information, and includes model establishment and update.

With reference to the first aspect or the first possible implementation of the first aspect of this application, in a second possible implementation of the first aspect of this application, that an IMF obtains feature information of a GF service includes: The IMF receives the feature information sent by a service operation system (SOS) or a service management function unit (SMF); and/or the IMF receives the feature information sent by the base station.

With reference to any one of the first aspect or the possible implementations of the first aspect of this application, in a third possible implementation of the first aspect of this application, the IMF may further determine a GF resource consumption model based on the feature information, where the GF resource consumption model includes GF resources that have been used in different time periods by all the UEs that access the cell or the network slice. That the IMF determines the GF resource information corresponding to the feature information includes: The IMF determines a GF resource requirement of the cell or a GF resource requirement of the network slice based on the GF resource consumption model, thereby determining the GF resource information.

With reference to any one of the first aspect or the possible implementations of the first aspect of this application, in a fourth possible implementation of the first aspect of this application, the feature information includes one or more of the following information: a quantity of UEs, a service type, a quantity of service requests, a service request interval, and a first data packet size, to represent a service in the cell or on the network slice.

According to a second aspect of this application, a GF resource allocation method is provided. A base station receives first GF resource information or GF resource indication information sent by an IMF, where the GF resource information is used to describe GF resources corresponding to a cell or GF resources corresponding to a network slice, the cell corresponds to the base station, and the network slice corresponds to the base station; and the GF resource indication information is used to indicate the base station to determine the first GF resource information; and the base station determines, based on the first GF resource information or the GF resource indication information, GF resources to be allocated to UE, where the UE corresponds to the cell, or the UE corresponds to the network slice.

In this application, the IMF sends the GF resource information to the base station, to directly notify the base station of the GF resources corresponding to the cell or the network slice; or sends the GF resource indication information to the base station, so that the base station actively determines the GF resource information, to indirectly notify the base station of the GF resources corresponding to the cell or the network slice; and the base station determines, based on the first GF resource information, the GF resources to be allocated to the UE. The setting not only can meet a GF resource requirement of a GF service in the cell or on the network slice, but also can avoid a waste of GF resources in the cell or on the network slice. In this way, proper allocation and dynamic allocation of the GF resources in the cell or on the network slice are implemented.

With reference to the second aspect of this application, in a first possible implementation of the second aspect of this application, the GF resource indication information specifically includes a first GF resource allocation model corresponding to the cell or the network slice, where the first GF resource allocation model includes GF resources to be allocated in different time periods to all UEs that access the cell or the network slice; and that the base station determines, based on the GF resource indication information, GF resources to be allocated to UE includes: The base station determines the first GF resource information based on the first GF resource allocation model; and the base station determines, based on the first GF resource information, the GF resources to be allocated to the UE.

With reference to the second aspect or the first possible implementation of the second aspect of this application, in a second possible implementation of the second aspect of this application, the base station may further obtain feature information of a service of the UE; and the base station determines, based on the feature information, a second GF resource allocation model corresponding to the UE, where the second GF resource allocation model includes the GF resources to be allocated to the UE in different time periods; and that the base station determines, based on the first GF resource information, the GF resources to be allocated to the UE that accesses the cell or the network slice includes: The base station determines, based on the first GF resource information and the second GF resource allocation model, the GF resources to be allocated to the UE.

In this application, the base station may further continue to perform GF resource allocation for the UE. Uplink and downlink GF resource allocation meet a GF resource requirement of the cell or the network slice, and may further meet a GF resource requirement of the UE that accesses the cell or the network slice. In addition, effective GF resource utilization can be greatly improved, and a waste of GF resources can be avoided.

With reference to the second possible implementation of the second aspect of this application, in a third possible implementation of the second aspect of this application, the method further includes:

The base station determines, based on the feature information, a GF resource consumption model corresponding to the UE, where the GF resource consumption model includes GF resources that have been used in different time periods by the UE; and that the base station determines, based on the first GF resource information, the GF resources to be allocated to the UE includes: The base station determines, based on the first GF resource information and the GF resource consumption model, a GF resource requirement of the UE, thereby determining the GF resources to be allocated to the UE; and that the base station determines, based on the feature information, a second GF resource allocation model corresponding to the UE includes: The base station determines, based on the feature information and the GF resource consumption model, the second GF resource allocation model.

With reference to the second or the third possible implementation of the second aspect of this application, in a fourth possible implementation of the second aspect of this application, the feature information includes one or more of the following information: a service type, a quantity of service requests, a service request interval, and a data packet size, to represent the service of the UE.

With reference to any one of the second aspect or the possible implementations of the second aspect of this application, in a fifth possible implementation of the second aspect of this application, the method further includes: The base station sends second GF resource information to the UE, where the second GF resource information is used to describe the GF resources to be allocated to the UE. In this way, the UE may transmit data of the GF service on the GF resources described in the second GF resource information.

According to a third aspect of this application, a GF resource allocation method is provided. A management unit of a base station receives first GF resource information or GF resource indication information sent by an IMF, where the GF resource information is used to describe GF resources corresponding to a cell or GF resources corresponding to a network slice, the cell corresponds to the base station, and the network slice corresponds to the base station; and the GF resource indication information is used to indicate the management unit of the base station to determine the first GF resource information; and the management unit of the base station determines, based on the first GF resource information or the GF resource indication information, GF resources to be allocated to UE, where the UE corresponds to the cell, or the UE corresponds to the network slice.

In this application, the IMF sends the GF resource information to the management unit of the base station, to directly notify the management unit of the base station of the GF resources corresponding to the cell or the network slice; or sends the GF resource indication information to the management unit of the base station, so that the management unit of the base station actively determines the GF resource information, to indirectly notify the management unit of the base station of the GF resources corresponding to the cell or the network slice; and the management unit of the base station determines, based on the first GF resource information, the GF resources to be allocated to the UE. The setting not only can meet a GF resource requirement of a GF service in the cell or on the network slice, but also can avoid a waste of GF resources in the cell or on the network slice. In this way, proper allocation and dynamic allocation of the GF resources in the cell or on the network slice are implemented.

With reference to the third aspect of this application, in a first possible implementation of the third aspect of this application, the GF resource indication information specifically includes a first GF resource allocation model corresponding to the cell or the network slice, where the first GF resource allocation model includes GF resources to be allocated in different time periods to all UEs that access the cell or the network slice; and that the management unit of the base station determines, based on the GF resource indication information, GF resources to be allocated to UE includes: The management unit of the base station determines the first GF resource information based on the first GF resource allocation model; and the base station determines, based on the first GF resource information, the GF resources to be allocated to the UE.

With reference to the third aspect or the first possible implementation of the third aspect of this application, in a second possible implementation of the third aspect of this application, the management unit of the base station may further obtain feature information of a service of the UE; and the management unit of the base station determines, based on the feature information, a second GF resource allocation model corresponding to the UE, where the second GF resource allocation model includes the GF resources to be allocated to the UE in different time periods; and that the management unit of the base station determines, based on the first GF resource information, the GF resources to be allocated to the UE includes: The management unit of the base station determines, based on the first GF resource information and the second GF resource allocation model, the GF resources to be allocated to the UE.

In this application, the management unit of the base station may further continue to perform GF resource allocation for the UE. Uplink and downlink GF resource allocation meet a GF resource requirement of the cell or the network slice, and may further meet a GF resource requirement of the UE that accesses the cell or the network slice. In addition, effective GF resource utilization can be greatly improved, and a waste of GF resources can be avoided.

With reference to the second possible implementation of the third aspect of this application, in a third possible implementation of the third aspect of this application, the method further includes:

The management unit of the base station determines, based on the feature information, a GF resource consumption model corresponding to the UE, where the GF resource consumption model includes GF resources that have been used in different time periods by the UE; and that the management unit of the base station determines, based on the first GF resource information, the GF resources to be allocated to the UE includes: The management unit of the base station determines, based on the first GF resource information and the GF resource consumption model, a GF resource requirement of the UE, thereby determining the GF resources to be allocated to the UE; or that the management unit of the base station determines, based on the feature information, a second GF resource allocation model corresponding to the UE includes: The management unit of the base station determines, based on the feature information and the GF resource consumption model, the second GF resource allocation model.

With reference to the third or the third possible implementation of the third aspect of this application, in a fourth possible implementation of the third aspect of this application, the feature information includes one or more of the following information: a service type, a quantity of service requests, a service request interval, and a data packet size, to represent the service of the UE.

With reference to any one of the third aspect or the possible implementations of the third aspect of this application, in a fifth possible implementation of the third aspect of this application, the method further includes: The management unit of the base station sends second GF resource information to the base station, where the second GF resource information is used to describe the GF resources to be allocated to the UE. In this way, the base station forwards the second GF resource information to the UE, and the UE may transmit data of the GF service on the GF resources described in the second GF resource information.

According to a fourth aspect of this application, a GF resource allocation method is provided, including: A base station obtains first feature information of a service; the base station determines first GF resource information corresponding to the first feature information, where the first GF resource information is used to describe GF resources corresponding to a network slice of a cell or GF resources corresponding to a network slice, the cell corresponds to the base station, and the network slice corresponds to the base station; and the base station determines, based on the first GF resource information, GF resources to be allocated to UE, where the UE corresponds to the cell, or the UE corresponds to the network slice.

In this application, an autonomous learning capability of the base station is fully used. The base station obtains the first feature information of a service in the cell or on the network slice; and then determines the first GF resource information based on the first feature information, dynamically adjusts the GF resources corresponding to the cell or the network slice that are described in the first GF resource information, and determines, based on the first GF resource information, the allocated GF resources. The setting not only can meet a GF resource requirement of the GF service in the cell or on the network slice, but also can avoid a waste of GF resources in the cell or on the network slice. In this way, proper allocation and dynamic allocation of the GF resources in the cell or on the network slice are implemented.

With reference to the fourth aspect of this application, in a first possible implementation of the fourth aspect of this application, that the base station determines first GF resource information corresponding to the first feature information includes: The base station determines the first GF resource information based on a first GF resource allocation model, where the first GF resource allocation model includes GF resources to be allocated in different time periods to all UEs that access the cell or the network slice, and the first GF resource allocation model is obtained based on the first feature information, and includes model establishment and update.

With reference to the fourth aspect or the first possible implementation of the fourth aspect of this application, in a second possible implementation of the fourth aspect of this application, the base station may further determine a first GF resource consumption model based on the first feature information, where the first GF resource consumption model includes GF resources that have been used in different time periods by all the UEs that access the cell or the network slice. That the base station determines the first GF resource information corresponding to the feature information includes: The base station determines a GF resource requirement of the cell or a GF resource requirement of the network slice based on the first GF resource consumption model, thereby determining the first GF resource information.

With reference to any one of the fourth aspect or the possible implementations of the fourth aspect of this application, in a third possible implementation of the fourth aspect of this application, the first feature information includes one or more of the following information: a quantity of UEs, a first service type, a quantity of first service requests, a first service request interval, and a first data packet size, to represent a service in the cell or on the network slice.

With reference to any one of the fourth aspect or the possible implementations of the fourth aspect of this application, in a fourth possible implementation of the fourth aspect of this application, the base station may further obtain second feature information of a service of the UE; and the base station determines, based on the second feature information, a second GF resource allocation model corresponding to the UE, where the second GF resource allocation model includes the GF resources to be allocated to the UE in different time periods; and that the base station determines, based on the first GF resource information, the GF resources to be allocated to the UE includes: The base station determines, based on the first GF resource information and the second GF resource allocation model, the GF resources to be allocated to the UE.

In this application, the base station may further continue to perform GF resource allocation for the UE. Uplink and downlink GF resource allocation meet a GF resource requirement of the cell or the network slice, and may further meet a GF resource requirement of the UE that accesses the cell or the network slice. In addition, effective GF resource utilization can be greatly improved, and a waste of GF resources can be avoided.

With reference to the fourth possible implementation of the fourth aspect of this application, in a fifth possible implementation of the fourth aspect of this application, the method further includes:

The base station determines, based on the second feature information, a second GF resource consumption model corresponding to the UE, where the second GF resource consumption model includes GF resources that have been used in different time periods by the UE; and that the base station determines, based on the first GF resource information, the GF resources to be allocated to the UE includes: The base station determines, based on the first GF resource information and the second GF resource consumption model, a GF resource requirement of the UE, thereby determining the GF resources to be allocated to the UE; and that the base station determines, based on the feature information, a second GF resource allocation model corresponding to the UE includes: The base station determines, based on the feature information and the second GF resource consumption model, the second GF resource allocation model.

With reference to the fourth or the fifth possible implementation of the fourth aspect of this application, in a sixth possible implementation of the fourth aspect of this application, the feature information may specifically include one or any combination of the following information: a second service type, a quantity of second service requests, a second service request interval, and a second data packet size, to represent the service of the UE.

With reference to any one of the fourth aspect or the possible implementations of the fourth aspect of this application, in a seventh possible implementation of the fourth aspect of this application, the method further includes: The base station sends second GF resource information to the UE, where the second GF resource information is used to describe the GF resources to be allocated to the UE. In this way, the UE may transmit data of the GF service on the GF resources described in the second GF resource information.

According to a fifth aspect of this application, a GF resource allocation method is provided, including: A management unit of a base station obtains first feature information of a service; the management unit of the base station determines first GF resource information corresponding to the first feature information, where the first GF resource information is used to describe GF resources corresponding to a cell or GF resources corresponding to a network slice, the cell corresponds to the base station, and the network slice corresponds to the base station; and the management unit of the base station determines, based on the first GF resource information, GF resources to be allocated to UE, where the UE corresponds to the cell, or the UE corresponds to the network slice.

In this application, an autonomous learning capability of the management unit of the base station is fully used. The management unit of the base station obtains the first feature information of the service in the cell or on the network slice; and then determines the first GF resource information based on the first feature information, dynamically adjusts the GF resources corresponding to the cell or the network slice that are described in the first GF resource information, and determines, based on the first GF resource information, the GF resources to be allocated to the UE. The setting not only can meet a GF resource requirement of the GF service in the cell or on the network slice, but also can avoid a waste of GF resources in the cell or on the network slice. In this way, proper allocation and dynamic allocation of the GF resources in the cell or on the network slice are implemented.

With reference to the fifth aspect of this application, in a first possible implementation of the fifth aspect of this application, that the management unit of the base station determines first GF resource information corresponding to the first feature information includes: The management unit of the base station determines the first GF resource information based on a first GF resource allocation model, where the first GF resource allocation model includes GF resources to be allocated in different time periods to all UEs that access the cell or the network slice, and the first GF resource allocation model is obtained based on the first feature information, and includes model establishment and update.

With reference to the fifth aspect or the first possible implementation of the fifth aspect of this application, in a second possible implementation of the fifth aspect of this application, the management unit of the base station may further determine a first GF resource consumption model based on the first feature information, where the first GF resource consumption model includes GF resources that have been used in different time periods by all the UEs that access the cell or the network slice. That the management unit of the base station determines the GF resource information corresponding to the feature information includes: The base station determines a GF resource requirement of the cell or a GF resource requirement of the network slice based on the first GF resource consumption model, thereby determining the first GF resource information.

With reference to any one of the fifth aspect or the possible implementations of the fifth aspect of this application, in a third possible implementation of the fifth aspect of this application, the first feature information includes one or more of the following: a quantity of UEs, a first service type, a quantity of first service requests, a first service request interval, and a first data packet size, to represent a service in the cell or on the network slice.

With reference to any one of the fifth aspect or the possible implementations of the fifth aspect of this application, in a fourth possible implementation of the fifth aspect of this application, the management unit of the base station may further obtain second feature information of a service of the UE; and the management unit of the base station determines, based on the second feature information, a second GF resource allocation model corresponding to the UE, where the second GF resource allocation model includes the GF resources to be allocated to the UE in different time periods; and that the management unit of the base station determines, based on the first GF resource information, the GF resources to be allocated to the UE includes: The management unit of the base station determines, based on the first GF resource information and the second GF resource allocation model, the GF resources to be allocated to the UE.

In this application, the management unit of the base station may further continue to perform GF resource allocation for the UE. Uplink and downlink GF resource allocation meet a GF resource requirement of the cell or the network slice, and may further meet a GF resource requirement of the UE that accesses the cell or the network slice. In addition, effective GF resource utilization can be greatly improved, and a waste of GF resources can be avoided.

With reference to any one of the fifth aspect or the possible implementations of the fifth aspect of this application, in a fifth possible implementation of the fifth aspect of this application, the method further includes:

The management unit of the base station determines, based on the second feature information, a GF resource consumption model corresponding to the UE, where the GF resource consumption model includes GF resources that have been used in different time periods by the UE; and that the management unit of the base station determines, based on the first GF resource information, the GF resources to be allocated to the UE includes: The management unit of the base station determines, based on the first GF resource information and the second GF resource consumption model, a GF resource requirement of the UE, thereby determining the GF resources to be allocated to the UE; or that the management unit of the base station determines, based on the feature information, a second GF resource allocation model corresponding to the UE includes: The management unit of the base station determines, based on the feature information and the second GF resource consumption model, the second GF resource allocation model.

With reference to the fourth or the fifth possible implementation of the fifth aspect of this application, in a sixth possible implementation of the fifth aspect of this application, the second feature information includes one or more of the following information: a second service type, a quantity of second service requests, a second service request interval, and a second data packet size, to represent the service of the UE.

With reference to any one of the fifth aspect or the possible implementations of the fifth aspect of this application, in a seventh possible implementation of the fifth aspect of this application, the method further includes: The management unit of the base station sends second GF resource information to the base station, where the second GF resource information is used to describe the GF resources to be allocated to the UE. In this way, the base station forwards the second GF resource information to the UE, and the UE may transmit data of the GF service on the GF resources described in the second GF resource information.

According to a sixth aspect of this application, an IMF is provided, including: an obtaining unit, configured to obtain feature information of a service; a first determining unit, configured to determine GF resource information corresponding to the feature information or GF resource indication information corresponding to the feature information; and a sending unit, configured to send the GF resource information or the GF resource indication information to a base station or a management unit of a base station, where the GF resource information is used to describe GF resources corresponding to a cell or GF resources corresponding to a network slice, the cell corresponds to the base station, and the network slice corresponds to the base station; and the GF resource indication information is used to indicate the base station to determine the GF resource information or indicate the management unit to determine the GF resource information.

In this application, an autonomous learning capability of the IMF is fully used. The IMF obtains the feature information of the service, and may dynamically adjust, by using the feature information, the GF resources corresponding to the cell or the network slice. The IMF sends the GF resource information to the base station or the management unit of the base station, to directly notify the base station or the management unit of the base station of the GF resource corresponding to the cell or the network slice; or the IMF sends the GF resource indication information to the base station or the management unit of the base station, so that the base station or the management unit of the base station actively determines the GF resource information, to indirectly notify the management unit of the base station or the base station of GF resources to be allocated to the cell or the network slice. The setting not only can meet a GF resource requirement of the GF service in the cell or on the network slice, but also can avoid a waste of GF resources in the cell or on the network slice. In this way, proper allocation and dynamic allocation of the GF resources in the cell or on the network slice are implemented.

With reference to the sixth aspect of this application, in a first possible implementation of the sixth aspect of this application, the GF resource indication information specifically includes a GF resource allocation model corresponding to the cell or the network slice, and the GF resource allocation model includes GF resources to be allocated in different time periods to all UEs that access the cell or the network slice. The GF resource allocation model is obtained by the IMF based on the feature information, and includes model establishment and update.

With reference to the sixth aspect or the first possible implementation of the sixth aspect of this application, in a second possible implementation of the sixth aspect of this application, the obtaining unit is specifically configured to receive the feature information sent by a service management function unit (SMF); and/or receive, by the IMF, the feature information sent by the base station.

With reference to any one of the sixth aspect or the possible implementations of the sixth aspect of this application, in a third possible implementation of the sixth aspect of this application, the IMF further includes: a second determining unit, configured to determine a GF resource consumption model based on the feature information, where the GF resource consumption model includes GF resources that have been used in different time periods by all UEs that access the cell or the network slice; and the first determining unit is specifically configured to determine a GF resource requirement of the cell or a GF resource requirement of the network slice based on the GF resource consumption model, thereby determining the GF resource information.

With reference to any one of the sixth aspect or the possible implementations of the sixth aspect of this application, in a fourth possible implementation of the sixth aspect of this application, the feature information includes one or more of the following information: a quantity of UEs, a service type, a quantity of service requests, a service request interval, and a first data packet size, to represent a service in the cell or on the network slice.

According to a seventh aspect of this application, a base station is provided. The base station includes: a receiving unit, configured to receive first GF resource information or GF resource indication information sent by an IMF, where the GF resource information is used to describe GF resources corresponding to a cell or GF resources corresponding to a network slice, the cell corresponds to the base station, and the network slice corresponds to the base station; and the GF resource indication information is used to indicate the base station to determine the first GF resource information; and a first determining unit, configured to determine, based on the first GF resource information or the GF resource indication information, GF resources to be allocated to UE, where the UE corresponds to the cell, or the UE corresponds to the network slice.

In this application, the IMF sends the GF resource information to the base station, to directly notify the base station of the GF resources corresponding to the cell or the network slice; or sends the GF resource indication information to the base station, so that the base station actively determines the GF resource information, to indirectly notify the base station of the GF resources corresponding to the cell or the network slice; and the base station determines, based on the first GF resource information, the GF resources to be allocated to the UE. The setting not only can meet a GF resource requirement of a GF service in the cell or on the network slice, but also can avoid a waste of GF resources in the cell or on the network slice. In this way, proper allocation and dynamic allocation of the GF resources in the cell or on the network slice are implemented.

With reference to the seventh aspect of this application, in a first possible implementation of the seventh aspect of this application, the GF resource indication information specifically includes a first GF resource allocation model corresponding to the cell or the network slice, where the first GF resource allocation model includes GF resources to be allocated in different time periods to all UEs that access the cell or the network slice; and the first determining unit is specifically configured to: determine the first GF resource information based on the first GF resource allocation model; and determine, based on the first GF resource information, the GF resources to be allocated to the UE.

With reference to the seventh aspect or the first possible implementation of the seventh aspect of this application, in a second possible implementation of the seventh aspect of this application, the base station further includes: an obtaining unit, configured to obtain feature information of a service of the UE; and a second determining unit, configured to determine, based on the feature information, a second GF resource allocation model corresponding to the UE, where the second GF resource allocation model includes the GF resources to be allocated to the UE in different time periods; and the first determining unit is specifically configured to determine, based on the first GF resource information and the second GF resource allocation model, the GF resources to be allocated to the UE.

In this application, the base station may further continue to perform GF resource allocation for the UE. Uplink and downlink GF resource allocation meet a GF resource requirement of the cell or the network slice, and may further meet a GF resource requirement of the UE that accesses the cell or the network slice. In addition, effective GF resource utilization can be greatly improved, and a waste of GF resources can be avoided.

With reference to the second possible implementation of the seventh aspect of this application, in a third possible implementation of the seventh aspect of this application, the base station further includes:

a third determining unit, configured to determine, based on the feature information, a GF resource consumption model corresponding to the UE, where the GF resource consumption model includes GF resources that have been used in different time periods by the UE; and the first determining unit is specifically configured to determine, based on the first GF resource information and the GF resource consumption model, the GF resources to be allocated to the UE; or the second determining unit is specifically configured to determine, based on the feature information and the GF resource consumption model, the second GF resource allocation model.

With reference to the second or the third possible implementation of the seventh aspect of this application, in a fourth possible implementation of the seventh aspect of this application, the feature information includes one or more of the following information: a service type, a quantity of service requests, a service request interval, and a data packet size, to represent the service of the UE.

With reference to any one of the seventh aspect or the possible implementations of the seventh aspect of this application, in a fifth possible implementation of the seventh aspect of this application, the base station further includes: a sending unit, configured to send second GF resource information to the UE, where the second GF resource information is used to describe the GF resources to be allocated to the UE. In this way, the UE may transmit data of the GF service on the GF resources described in the second GF resource information.

According to an eighth aspect of this application, a management unit of a base station is provided. The management unit of the base station includes: a receiving unit, configured to receive first GF resource information or GF resource indication information sent by an IMF, where the GF resource information is used to describe GF resources corresponding to a cell or GF resources corresponding to a network slice, the cell corresponds to the base station, and the network slice corresponds to the base station; and the GF resource indication information is used to indicate the base station to determine the first GF resource information; and a first determining unit, configured to determine, based on the first GF resource information or the GF resource indication information, GF resources to be allocated to UE, where the UE corresponds to the cell, or the UE corresponds to the network slice.

In this application, the IMF sends the GF resource information to the management unit of the base station, to directly notify the management unit of the base station of the GF resources corresponding to the cell or the network slice; or sends the GF resource indication information to the management unit of the base station, so that the management unit of the base station actively determines the GF resource information, to indirectly notify the management unit of the base station of the GF resources corresponding to the cell or the network slice; and the management unit of the base station determines, based on the first GF resource information, the GF resources to be allocated to the UE. The setting not only can meet a GF resource requirement of a GF service in the cell or on the network slice, but also can avoid a waste of GF resources in the cell or on the network slice. In this way, proper allocation and dynamic allocation of the GF resources in the cell or on the network slice are implemented.

With reference to the eighth aspect of this application, in a first possible implementation of the eighth aspect of this application, the GF resource indication information specifically includes a first GF resource allocation model corresponding to the cell or the network slice, where the first GF resource allocation model includes GF resources to be allocated in different time periods to all UEs that access the cell or the network slice; and the first determining unit is specifically configured to: determine the first GF resource information based on the first GF resource allocation model; and determine, based on the first GF resource information, the GF resources to be allocated to the UE.

With reference to the eighth aspect or the first possible implementation of the eighth aspect of this application, in a second possible implementation of the eighth aspect of this application, the management unit of the base station further includes: an obtaining unit, configured to obtain feature information of a service of the UE; and a second determining unit, configured to determine, based on the feature information, a second GF resource allocation model corresponding to the UE, where the second GF resource allocation model includes the GF resources to be allocated to the UE in different time periods; and the first determining unit is specifically configured to determine, based on the first GF resource information and the second GF resource allocation model, the GF resources to be allocated to the UE.

In this application, the management unit of the base station may further continue to perform GF resource allocation for the UE. Uplink and downlink GF resource allocation meet a GF resource requirement of the cell or the network slice, and may further meet a GF resource requirement of the UE that accesses the cell or the network slice. In addition, effective GF resource utilization can be greatly improved, and a waste of GF resources can be avoided.

With reference to the second possible implementation of the eighth aspect of this application, in a third possible implementation of the eighth aspect of this application, the management unit of the base station further includes:

a third determining unit, configured to determine, based on the feature information, a GF resource consumption model corresponding to the UE, where the GF resource consumption model includes GF resources that have been used in different time periods by the UE; and the first determining unit is specifically configured to determine, based on the first GF resource information and the GF resource consumption model, the GF resources to be allocated to the UE; or the second determining unit is specifically configured to determine, based on the feature information and the GF resource consumption model, the second GF resource allocation model.

With reference to the second or the third possible implementation of the eighth aspect of this application, in a fourth possible implementation of the eighth aspect of this application, the feature information includes one or more of the following information: a service type, a quantity of service requests, a service request interval, and a data packet size, to represent the service of the UE.

With reference to any one of the eighth aspect or the possible implementations of the eighth aspect of this application, in a fifth possible implementation of the seventh aspect of this application, the management unit of the base station further includes: a sending unit, configured to send second GF resource information to the base station, where the second GF resource information is used to describe the GF resources to be allocated to the UE. In this way, the base station forwards the second GF resource information to the UE, and the UE may transmit data of the GF service on the GF resources described in the second GF resource information.

According to a ninth aspect of this application, a base station is provided, including: a first obtaining unit, configured to obtain first feature information of a service; a first determining unit, configured to determine first GF resource information corresponding to the first feature information, where the first GF resource information is used to describe GF resources corresponding to a cell or GF resources corresponding to a network slice, the cell corresponds to the base station, and the network slice corresponds to the base station; and a second determining unit, configured to determine, based on the first GF resource information, GF resources to be allocated to UE, where the UE corresponds to the cell, or the UE corresponds to the network slice.

In this application, an autonomous learning capability of the base station is fully used. The base station obtains the first feature information of the service in the cell or on the network slice; and then determines the first GF resource information based on the first feature information, dynamically adjusts the GF resources corresponding to the cell or the network slice that are described in the first GF resource information, and determines, based on the first GF resource information, the allocated GF resources. The setting not only can meet a GF resource requirement of the GF service in the cell or on the network slice, but also can avoid a waste of GF resources in the cell or on the network slice. In this way, proper allocation and dynamic allocation of the GF resources in the cell or on the network slice are implemented.

With reference to the ninth aspect of this application, in a first possible implementation of the ninth aspect of this application, the first determining unit is specifically configured to determine the first GF resource information based on a first GF resource allocation model, where the first GF resource allocation model includes GF resources to be allocated in different time periods to all UEs that access the cell or the network slice, and the first GF resource allocation model is obtained based on the first feature information, and includes model establishment and update.

With reference to the ninth aspect or the first possible implementation of the ninth aspect of this application, in a second possible implementation of the ninth aspect of this application, the base station further includes: a third determining unit, configured to determine a first GF resource consumption model based on the first feature information, where the first GF resource consumption model includes GF resources that have been used in different time periods by all UEs that access the cell or the network slice; and the first determining unit is specifically configured to determine a GF resource requirement of the cell or a GF resource requirement of the network slice based on the first GF resource consumption model, thereby determining the first GF resource information.

With reference to any one of the ninth aspect or the possible implementations of the ninth aspect of this application, in a third possible implementation of the ninth aspect of this application, the first feature information includes one or more of the following information: a quantity of UEs, a first service type, a quantity of first service requests, a first service request interval, and a first data packet size, to represent a service in the cell or on the network slice.

With reference to any one of the ninth aspect or the possible implementations of the ninth aspect of this application, in a fourth possible implementation of the ninth aspect of this application, the base station further includes: a second obtaining unit, configured to obtain second feature information of the service of the UE; and a fourth determining unit, configured to determine, based on the second feature information, a second GF resource allocation model corresponding to the UE, where the second GF resource allocation model includes the GF resources to be allocated to the UE in different time periods; and the second determining unit is specifically configured to determine, based on the first GF resource information and the second GF resource allocation model, the GF resources to be allocated to the UE.

In this application, the base station may further continue to perform GF resource allocation for the UE. Uplink and downlink GF resource allocation meet a GF resource requirement of the cell or the network slice, and may further meet a GF resource requirement of the UE that accesses the cell or the network slice. In addition, effective GF resource utilization can be greatly improved, and a waste of GF resources can be avoided.

With reference to the ninth possible implementation of the ninth aspect of this application, in a fifth possible implementation of the ninth aspect of this application, the base station further includes:

a fifth determining unit, configured to determine, based on the second feature information, a second GF resource consumption model corresponding to the UE, where the second GF resource consumption model includes GF resources that have been used in different time periods by the UE; and the second determining unit is specifically configured to determine, based on the first GF resource information and the second GF resource consumption model, a GF resource requirement of the UE, thereby determining the GF resources to be allocated to the UE; or the fourth determining unit is specifically configured for the base station to determine, based on the second feature information and the second GF resource consumption model, the second GF resource allocation model.

With reference to the fourth or the fifth possible implementation of the ninth aspect of this application, in a sixth possible implementation of the ninth aspect of this application, the second feature information may specifically include one or any combination of the following information: a second service type, a quantity of second service requests, a second service request interval, and a second data packet size, to represent the service of the UE.

With reference to any one of the ninth aspect or the possible implementations of the ninth aspect of this application, in a seventh possible implementation of the ninth aspect of this application, the base station further includes: a sending unit, configured to send second GF resource information to the UE, where the second GF resource information is used to describe the GF resources to be allocated to the UE. In this way, the UE may transmit data of the GF service on the GF resources described in the second GF resource information.

According to a tenth aspect of this application, a management unit of a base station is provided, including: a first obtaining unit, configured to obtain first feature information of a service; a first determining unit, configured to determine first GF resource information corresponding to the first feature information, where the first GF resource information is used to describe GF resources corresponding to a cell or GF resources corresponding to a network slice, the cell corresponds to the base station, and the network slice corresponds to the base station; and a second determining unit, configured to determine, based on the first GF resource information, GF resources to be allocated to UE, where the UE corresponds to the cell, or the UE corresponds to the network slice.

In this application, an autonomous learning capability of the management unit of the base station is fully used. The management unit of the base station obtains the first feature information of the service in the cell or on the network slice; and then determines the first GF resource information based on the first feature information, dynamically adjusts the GF resources corresponding to the cell or the network slice that are described in the first GF resource information, and determines, based on the first GF resource information, the GF resources to be allocated to the UE. The setting not only can meet a GF resource requirement of the GF service in the cell or on the network slice, but also can avoid a waste of GF resources in the cell or on the network slice. In this way, proper allocation and dynamic allocation of the GF resources in the cell or on the network slice are implemented.

With reference to the tenth aspect of this application, in a first possible implementation of the tenth aspect of this application, the first determining unit is specifically configured to determine the first GF resource information based on a first GF resource allocation model, where the first GF resource allocation model includes GF resources to be allocated in different time periods to all UEs that access the cell or the network slice, and the first GF resource allocation model is obtained based on the first feature information, and includes model establishment and update.

With reference to the tenth aspect or the first possible implementation of the tenth aspect of this application, in a second possible implementation of the tenth aspect of this application, the management unit of the base station further includes: a third determining unit, configured to determine a first GF resource consumption model based on the first feature information, where the first GF resource consumption model includes GF resources that have been used in different time periods by all UEs that access the cell or the network slice; and the first determining unit is specifically configured to determine a GF resource requirement of the cell or a GF resource requirement of the network slice based on the first GF resource consumption model, thereby determining the first GF resource information.

With reference to any one of the tenth aspect or the possible implementations of the tenth aspect of this application, in a third possible implementation of the tenth aspect of this application, the first feature information includes one or more of the following information: a quantity of UEs, a first service type, a quantity of first service requests, a first service request interval, and a first data packet size, to represent a service in the cell or on the network slice.

With reference to any one of the tenth aspect or the possible implementations of the tenth aspect of this application, in a fourth possible implementation of the tenth aspect of this application, the management unit of the base station further includes: a second obtaining unit, configured to obtain second feature information of the service of the UE; and a fourth determining unit, configured to determine, based on the second feature information, a second GF resource allocation model corresponding to the UE, where the second GF resource allocation model includes the GF resources to be allocated to the UE in different time periods; and the second determining unit is specifically configured to determine, based on the first GF resource information and the second GF resource allocation model, the GF resources to be allocated to the UE.

In this application, the management unit of the base station may further continue to perform GF resource allocation for the UE. Uplink and downlink GF resource allocation meet a GF resource requirement of the cell or the network slice, and may further meet a GF resource requirement of the UE that accesses the cell or the network slice. In addition, effective GF resource utilization can be greatly improved, and a waste of GF resources can be avoided.

With reference to the ninth possible implementation of the tenth aspect of this application, in a fifth possible implementation of the tenth aspect of this application, the management unit of the base station further includes:

a fifth determining unit, configured to determine, based on the second feature information, a GF resource consumption model corresponding to the UE, where the GF resource consumption model includes GF resources that have been used in different time periods by the UE; and the second determining unit is specifically configured to determine, based on the first GF resource information and the second GF resource consumption model, a GF resource requirement of the UE, thereby determining the GF resources to be allocated to the UE; or the fourth determining unit is specifically configured for the base station to determine, based on the second feature information and the second GF resource consumption model, the second GF resource allocation model.

With reference to the fourth or the fifth possible implementation of the tenth aspect of this application, in a sixth possible implementation of the tenth aspect of this application, the second feature information may specifically include one or any combination of the following information: a second service type, a quantity of second service requests, a second service request interval, and a second data packet size, to represent the service of the UE.

With reference to any one of the tenth aspect or the possible implementations of the tenth aspect of this application, in a seventh possible implementation of the tenth aspect of this application, the management unit of the base station further includes: a sending unit, configured to send second GF resource information to the base station, where the second GF resource information is used to describe the GF resources to be allocated to the UE. In this way, the base station forwards the second GF resource information to the UE, and the UE may transmit data of the GF service on the GF resources described in the second GF resource information.

According to an eleventh aspect of this application, a computer-readable storage medium is further provided. The computer-readable storage medium includes an instruction, and when the instruction is run on an IMF, the IMF is enabled to perform the method according to any one of the first aspect or the possible implementations of the first aspect of this application.

According to a twelfth aspect of this application, a computer-readable storage medium is further provided. The computer-readable storage medium includes an instruction, and when the instruction is run on a base station, the base station is enabled to perform the method according to any one of the second aspect, the possible implementations of the second aspect, the fourth aspect, or the possible implementations of the fourth aspect of this application.

According to a thirteenth aspect of this application, a computer-readable storage medium is further provided. The computer-readable storage medium includes an instruction, and when the instruction is run on a management unit of a base station, the management unit of the base station is enabled to perform the method according to any one of the third aspect, the possible implementations of the third aspect, the fifth aspect, or the possible implementations of the fifth aspect of this application.

DESCRIPTION OF EMBODIMENTS

This application provides a grant-free (GF) resource allocation method and a related device, to properly allocate GF resources.

First, to facilitate clearer understanding of this application, an application scenario of GF resource allocation is described.

Figure 1:
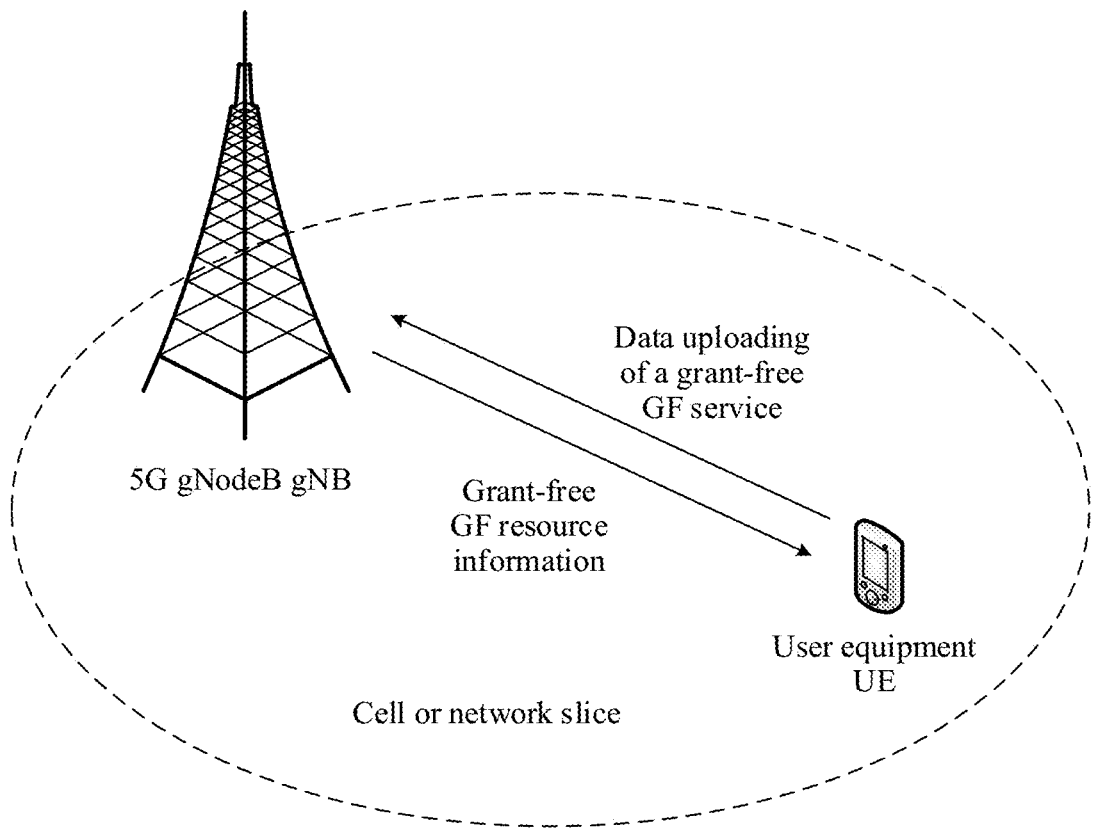
FIG. 1 is a schematic diagram of an embodiment of an application scenario of GF resource allocation according to this application.

FIG. 1 is a schematic diagram of an embodiment of an application scenario of GF resource allocation according to this application. In a cell or a network slice covered by a radio signal of a gNB, there is at least one UE, the gNB delivers GF resource information to the UE, and the UE uploads, based on GF resources described in the GF resource information, data of a GF service via the gNB.

The UE may be a device such as a smartphone, a tablet computer, a personal digital assistant (PDA), a smartwatch, a smart band, or a vehicle-mounted computer.

Figure 2:
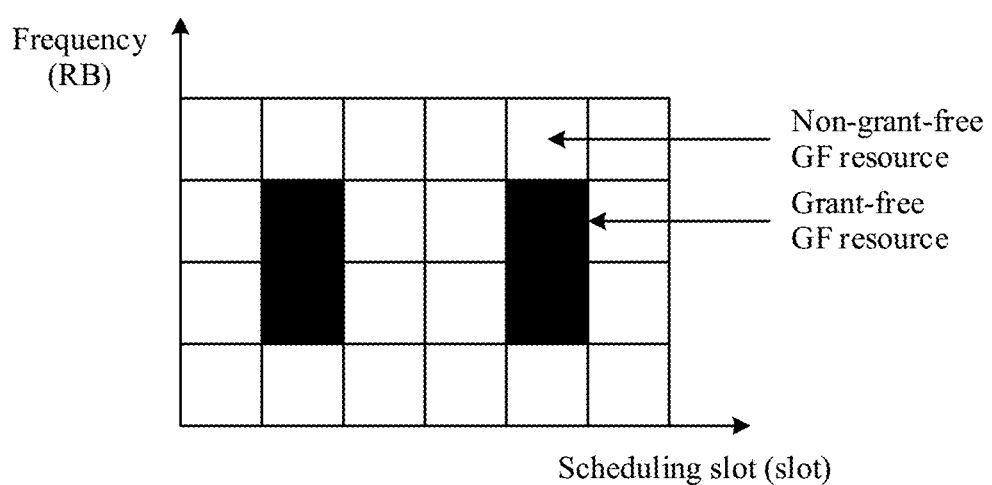
FIG. 2 is a schematic diagram of an embodiment of GF resources according to this application.

For the GF resources, refer to FIG. 2. FIG. 2 is a schematic diagram of an embodiment of GF resources according to this application. The GF resource is a time-frequency resource, and includes a scheduling slot and a frequency for transmission of data of a GF service, where the scheduling slot may be indicated by a slot number, and the frequency may be indicated by a quantity of resource blocks (RB).

In the conventional technology, after manually presetting GF resource information, an operator delivers the GF resource information to the gNB by using an operation, administration, maintenance (OAM) technology. Then the gNB continues to deliver the GF resource information to UE that accesses a cell or a network slice, and the UE may upload the data of the GF service on GF resources described in the GF resource information.

However, in the manual GF resource allocation method, allocation of the GF resources corresponding to the cell or the network slice is fixed, which is not conducive to real-time proper use of the GF resources, and especially when a low-latency service and an enhanced mobile broadband (eMBB) service coexist on an air interface of the cell or the network slice, the eMBB service is affected due to preemption of air interface resources and data transmission opportunities.

Therefore, how to allocate the GF resources more properly is an important problem.

Next, an IMF, a base station, and a management unit of a base station in this application are described.

In this application, the IMF is a logical module responsible for intelligent network operation and maintenance, including network operation and maintenance work such as network data collection, network data analysis, network data management, and network control. The IMF may be an independently running hardware device, or may be integrated into another hardware device, for example, may be integrated into a network management system such as an operations support system (OSS), a network management system (NMS), and an element management system (EMS); may be integrated into a network element device such as a base station, and specifically, for example, the IMF may be integrated into a gNB, a centralized unit (CU) in the gNB, or a distributed unit (DU) in the gNB; or may be integrated into a cloud platform system. This is not specifically limited herein.

The base station may be not only a gNB, but also a base station of a type such as a 4G evolved NodeB (eNB) in a 4th generation (4G) mobile communications technology, a 3G NodeB (node base, node B) in a third generation (3G) mobile communications technology, or a 2G base station in a second generation (2G) mobile communications technology. This is not specifically limited herein.

The management unit of the base station may be a hardware device independent of the base station, or may be integrated into the base station. The management unit of the base station is configured to manage work of the base station. It may be understood that the management unit of the base station may correspond to one or more base stations. This is not specifically limited herein.

The following starts to describe specific content of this application.

Figure 3:
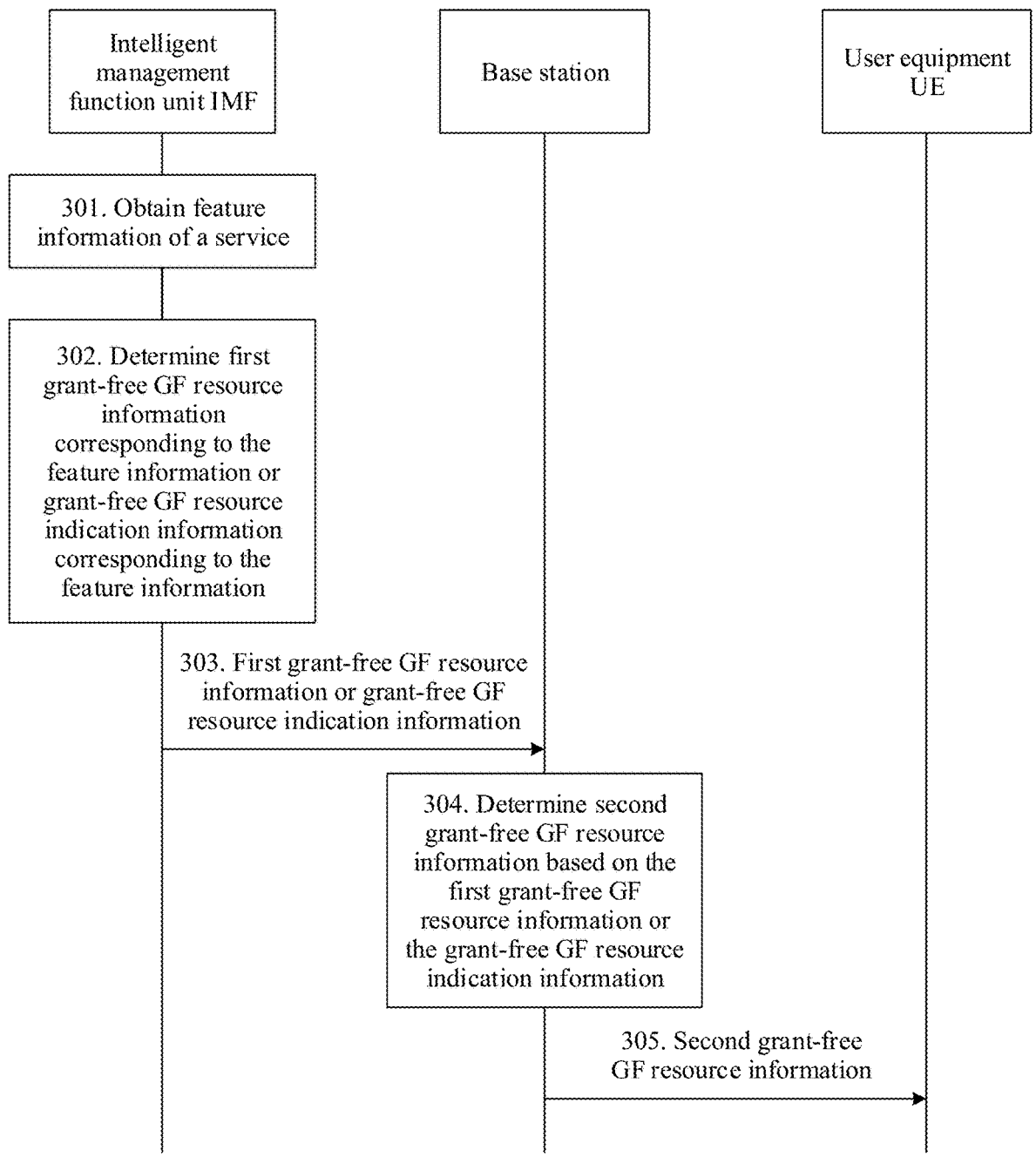
FIG. 3 is a schematic diagram of an embodiment of a GF resource allocation method according to this application.

A base station is used as an example. FIG. 3 is a schematic diagram of an embodiment of a GF resource allocation method according to this application. Specifically, the method includes the following steps.

Step 301. An IMF obtains feature information of a service.

The service includes services of one or more cells, and may include a GF service. UE that accesses a cell may transmit data of the GF service via a base station corresponding to the cell.

Alternatively, the service includes services of one or more network slices, and may include a GF service. UE that accesses a network slice may transmit the data of the GF service via a base station corresponding to the network slice.

Alternatively, the service may directly be a GF service. This is not specifically limited herein.

The IMF may directly obtain feature information of the GF service in a deployment phase of the GF service, or the IMF may obtain feature information of the GF service when the UE transmits the data of the GF service, or may obtain feature information of the GF service based on another triggering event. This is not specifically limited herein.

Step 302. The IMF determines first GF resource information corresponding to the feature information or GF resource indication information corresponding to the feature information.

The first GF resource information is used to describe GF resources corresponding to a cell or GF resources corresponding to a network slice, the cell corresponds to the base station, and the network slice corresponds to the base station; and the GF resource indication information is used to indicate the base station to determine the first GF resource information.

After the feature information of the service is obtained, a GF resource requirement of the cell or the network slice may be determined based on the feature information of the service, and the GF resources corresponding to the cell or the network slice are adjusted in real time.

It may be understood that, in this application, the GF resources corresponding to the cell or the network slice are GF resources to be allocated to all UEs that access the cell or the network slice.

Specifically, the IMF may directly notify, by using the first GF resource information corresponding to the feature information, the base station of the GF resources corresponding to the cell or the network slice. The GF resources are the GF resources to be allocated to all the UEs that access the cell or the network slice; or the base station is enabled to actively determine, by using GF resource indication information, the first GF resource information, to indirectly notify the base station of the GF resources corresponding to the cell or the network slice.

Step 303. The IMF sends the first GF resource information or the GF resource indication information to the base station.

After obtaining the first GF resource information or the GF resource indication information, the IMF may send the first GF resource information or the GF resource indication information to the base station.

Step 304. The base station determines second GF resource information based on the first GF resource information or the GF resource indication information.

The second GF resource information is used to describe GF resources to be allocated to the UE that accesses the cell or the network slice.

After receiving the first GF resource information, the base station may allocate, based on the first GF resource information, the second GF resource information to the UE corresponding to the cell or the network slice; or after receiving the GF resource indication information, the base station may determine the first GF resource information based on the GF resource indication information, and then allocate the second GF resource information to the UE that accesses the cell or the network slice.

The GF resources described in the second GF resource information may be the same as those described in the first GF resource information; or the GF resources described in the second GF resource information may be obtained by equally dividing the GF resources described in the first GF resource information by a quantity of UEs; or the GF resources described in the second GF resource information may be obtained by allocating the GF resources described in the first GF resource information in another allocation manner. This is not specifically limited herein.

Step 305. The base station sends the second GF resource information to the UE.

After determining the second GF resource information, the base station may send the second GF resource information to the UE, so that the UE may transmit the data of the GF service on the GF resources described in the second GF resource information.

In this application, an autonomous learning capability of the IMF is fully used. The IMF obtains the feature information of the service, and may dynamically adjust, by using the feature information, the GF resources corresponding to the cell or the network slice. The IMF sends the first GF resource information to the base station, to directly notify the base station of the GF resources corresponding to the cell or the network slice; or sends the GF resource indication information to the base station, so that the base station actively determines the first GF resource information, to indirectly notify the base station of the GF resources corresponding to the cell or the network slice. The base station determines, based on the first GF resource information, the GF resources to be allocated to the UE, and allocates the second GF resource information to the UE, where the GF resources described in the second GF resource information are used by the UE to transmit the data. The setting not only can meet a GF resource requirement of the GF service in the cell or on the network slice, but also can avoid a waste of GF resources in the cell or on the network slice. In this way, proper allocation and dynamic allocation of the GF resources in the cell or on the network slice are implemented.

Figure 4:
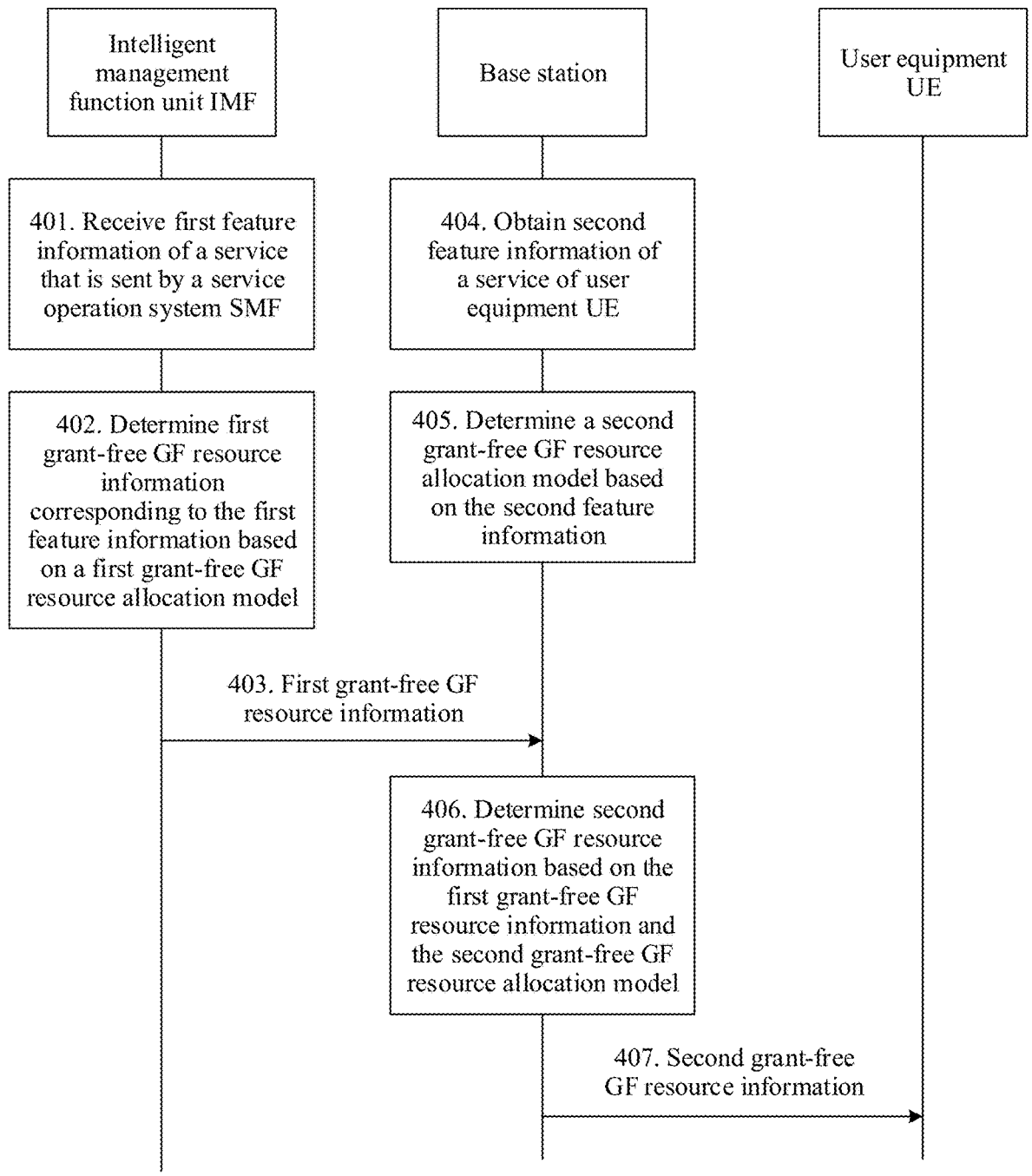
FIG. 4 is a schematic diagram of another embodiment of a GF resource allocation method according to this application.

FIG. 4 is a schematic diagram of another embodiment of a GF resource allocation method according to this application. Specifically, the method includes the following steps.

Step 401. An IMF receives first feature information of a service sent by a service management function unit (SMF).

The IMF may obtain the first feature information of the service in a cell or on a network slice through the SMF. The SMF is a device responsible for work related to service management and operation, and specifically performs work such as collecting statistics on traffic of a service or on a quantity of UEs. The SMF may be an operation system of a telecommunications operator, for example, a business support system (BSS), or an operation system of a third party operator. This is not specifically limited herein.

The IMF may directly receive the first feature information sent by the SMF, or may receive the first feature information sent by the SMF and forwarded by a unit such as a network orchestration function unit (NOF) or a network management function unit (NMF) between the IMF and the SMF. This is not specifically limited herein.

The IMF may periodically receive the first feature information sent by the SMF, or may receive, based on a triggering event such as service update, the first feature information sent by the SMF. This is not specifically limited herein.

The first feature information may specifically include one or more of the following: a quantity of UEs, a first service type, a quantity of first service requests, a first service request interval, and a first data packet size, to represent the service in the cell or on the network slice.

Further, the first feature information may further include a location of the UE. Therefore, when the first feature information obtained by the IMF corresponds to a plurality of cells or network slices, the IMF may identify, based on the location of the UE, a cell or a network slice that is accessed by the UE.

The location of the UE may be specifically obtained in a positioning manner such as satellite positioning, base station positioning, or wireless fidelity (Wi-Fi) positioning. This is not specifically limited herein.

Step 402. The IMF determines, based on a first GF resource allocation model, first GF resource information corresponding to the first feature information.

The first GF resource allocation model includes GF resources to be allocated in different time periods to all UEs that access the cell or the network slice.

The IMF may locally establish the first GF resource allocation model based on the first feature information, and subsequently, the IMF may quickly determine, based on specific first feature information, the GF resources corresponding to the cell or the network slice, to determine the first GF resource information corresponding to the cell or the network slice.

The IMF may further reconstruct or update the model based on real-time first feature information, to ensure accuracy of the first GF resource allocation model.

Figure 5:
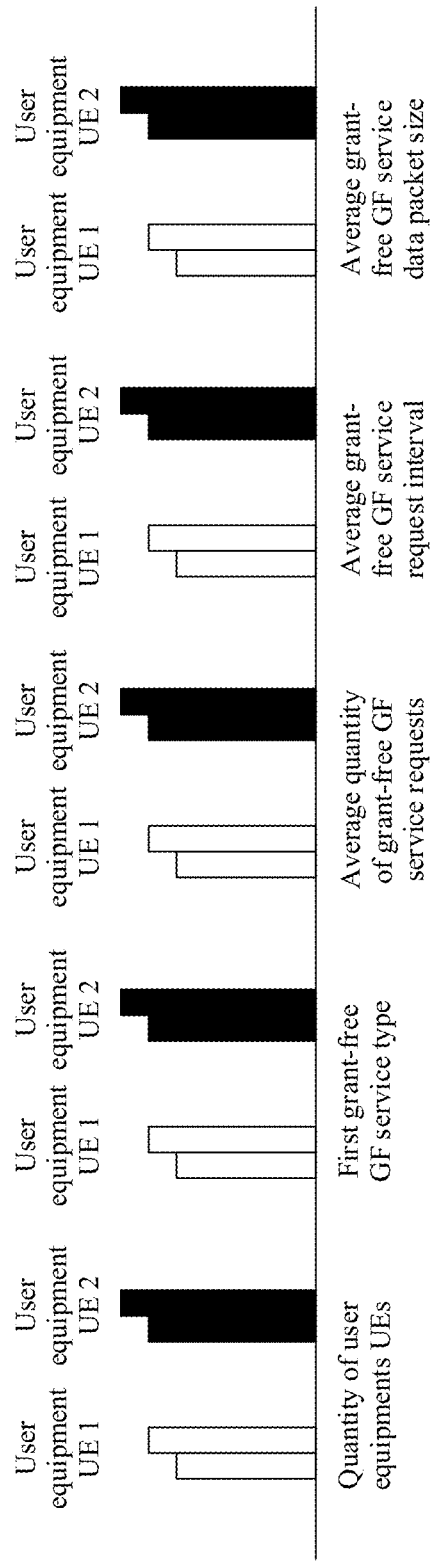
FIG. 5 is a schematic diagram of an embodiment of a first GF resource consumption model according to this application.

Alternatively, the IMF may locally establish a first GF resource consumption model based on the first feature information, where the first GF resource consumption model includes GF resources that have been used in different time periods by all the UEs that access the cell or the network slice. FIG. 5 is a schematic diagram of an embodiment of a first GF resource consumption model according to this application. GF resources that have been used in different time periods by services of all the UEs that access the cell or the network slice may be determined by using the first GF resource consumption model.

It is easy to understand that a data transmission rule of GF services of all the UEs that access the cell or the network slice may be determined by using the first GF resource consumption model, so that the GF resources corresponding to the cell or the network slice can be determined more quickly and accurately based on GF resource requirements of the services of all the UEs that access the cell or the network slice.

Step 403. The IMF sends the first GF resource information to a base station.

It may be understood that the IMF sends the first GF resource information to the base station, to directly notify the base station of the GF resources corresponding to the cell or the network slice.

Step 404. The base station obtains second feature information of the service of the UE.

It may be understood that the UE that accesses the cell or the network slice transmits data of the service via the base station, and the base station may obtain the second feature information of the service of the UE.

The second feature information may specifically include one or more of the following: a second service type, a quantity of second service requests, a second service request interval, and a second data packet size, to represent the service of the UE.

Further, the second feature information may further include a location of the UE, so that the cell or the network slice accessed by the UE can be identified based on the location of the UE.

The location of the UE may be specifically obtained in a positioning manner such as satellite positioning, base station positioning, or Wi-Fi positioning. This is not specifically limited herein.

Step 405. The base station determines a second GF resource allocation model based on the second feature information.

Similar to establishing the first GF resource allocation model by the IMF, the base station may locally establish the second GF resource allocation model based on the second feature information, where the second GF resource allocation model includes the GF resources to be allocated to the UE in different time periods. Subsequently, the GF resources required by the UE may be quickly determined based on specific second feature information.

The base station may further reconstruct or update the model based on real-time second feature information, to ensure accuracy of the second GF resource allocation model.

Figure 6:
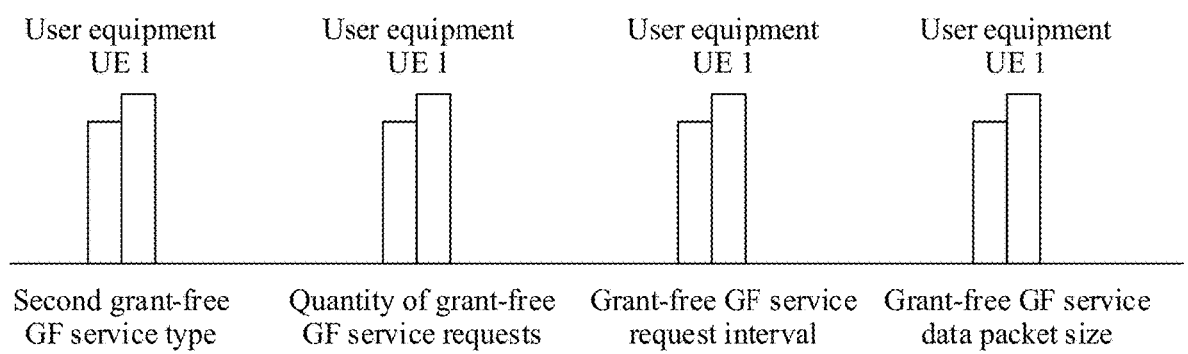
FIG. 6 is a schematic diagram of an embodiment of a second GF resource consumption model according to this application.

Alternatively, the base station may locally establish a second GF resource consumption model based on the second feature information, where the second GF resource consumption model includes GF resources that have been used in different time periods by the UE. FIG. 6 is a schematic diagram of an embodiment of a second GF resource consumption model according to this application. GF resources that have been used in different time periods by the service of the UE may be determined by using the second GF resource consumption model.

It is easy to understand that a data transmission rule of the GF service of the UE may be determined by using the second GF resource consumption model, so that the GF resources required by the UE can be determined more quickly and accurately based on the GF resource requirement of the GF service of the UE. Therefore, second GF resource information is determined, or the foregoing second GF resource allocation model (including establishment, reconstruction, or update) is determined based on the second GF resource consumption model.

It may be understood that step 404 and step 405 are performed before step 406, and there is no limitation on a time sequence of any one of step 401 to step 403. This is not specifically limited herein.

Step 406. The base station determines the second GF resource information based on the first GF resource information and the second GF resource allocation model.

After learning of the GF resources corresponding to the cell or the network slice and determining, by using the second GF resource allocation model, the GF resources required by the UE, the base station may determine the GF resources to be allocated to the UE, and determine the corresponding second GF resource information.

Alternatively, after learning of the GF resources corresponding to the cell or the network slice and determining, by using the second GF resource consumption model, the GF resources required by the UE, the base station may determine the GF resources to be allocated to the UE, and determine the corresponding second GF resource information.

Step 407. The base station sends the second GF resource information to the UE.

After determining the second GF resource information, the base station may send the second GF resource information to the UE, so that the UE may transmit the data of the GF service on the GF resources described in the second GF resource information.

Specifically, the base station may directly send the second GF resource information to the UE. Alternatively, the base station may include the second GF resource information in information, such as a radio resource control (RRC) message, a broadcast message, downlink control information, scheduling information, or a physical downlink control channel (PDCCH), that is to be sent to the UE, to send the second GF resource information to the UE. This is not specifically limited herein.

In this application, on one hand, the IMF may obtain the first feature information of the service in the cell or on the network slice, and then determine, based on the first GF resource allocation model or the first GF resource consumption model, the GF resources corresponding to the cell or the network slice; and the IMF sends the first GF resource information to the base station, to directly notify the base station of the GF resources corresponding to the cell or the network slice, and the base station may allocate the GF resources to the UE based on the first GF resource information, to perform GF resource allocation in the cell or on the network slice.

On the other hand, the base station may further obtain the second feature information of the service of the UE, and then determine the GF resource requirement of the UE based on the second GF resource allocation model or the second GF resource consumption model. Therefore, the base station may determine, based on the first GF resource information and the GF resource requirement of the UE, the GF resources to be allocated to the UE, and continue to perform GF resource allocation for the UE. Uplink and downlink GF resource allocation meet a GF resource requirement of the cell or the network slice, and may further meet the GF resource requirement of the UE that accesses the cell or the network slice. In addition, effective GF resource utilization can be greatly improved, and a waste of GF resources can be avoided.

Figure 7:
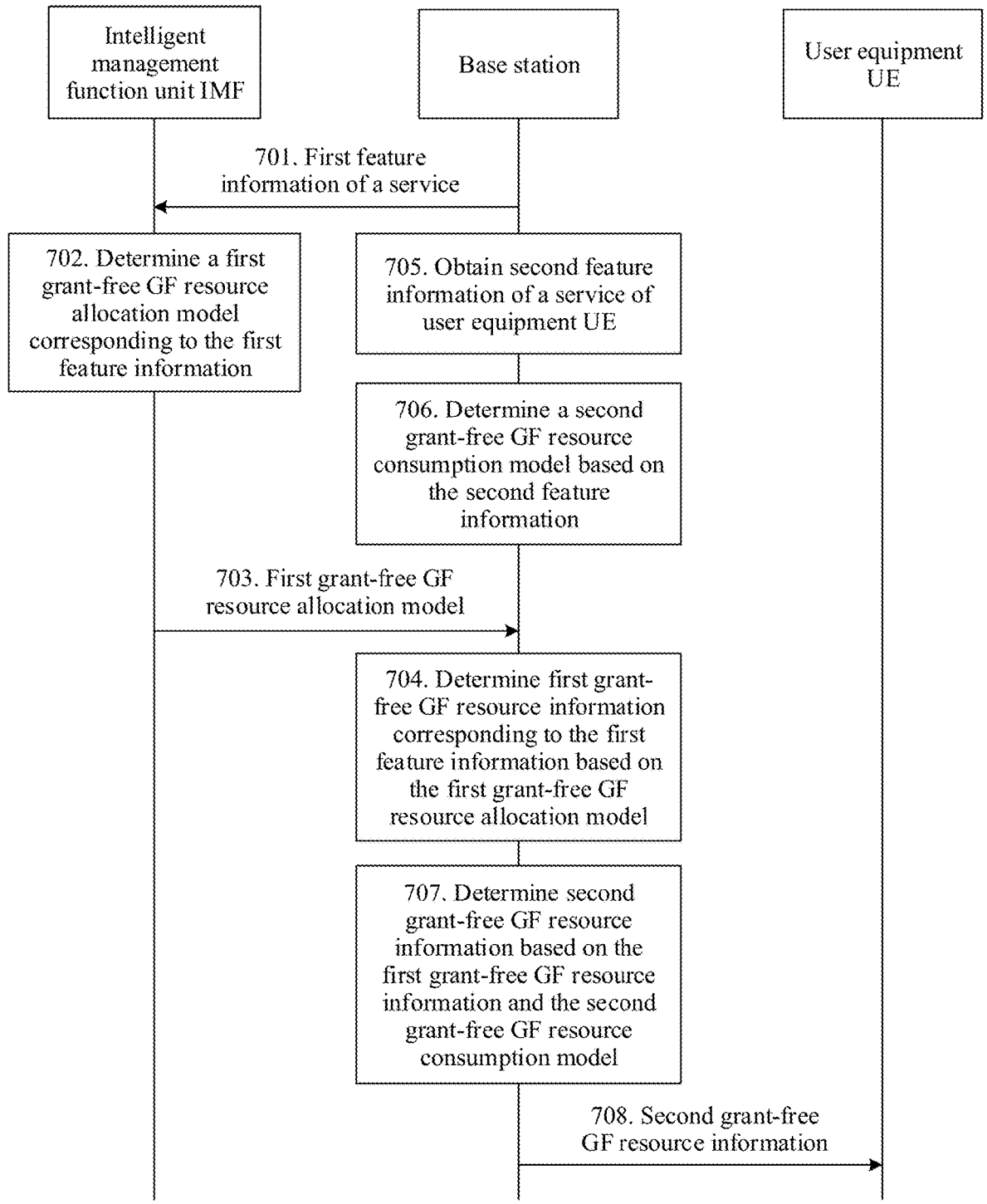
FIG. 7 is a schematic diagram of another embodiment of a GF resource allocation method according to this application.

FIG. 7 is a schematic diagram of another embodiment of a GF resource allocation method according to this application. Specifically, the method includes the following steps.

Step 701. A base station sends first feature information of a service to an IMF.

It may be understood that UEs that access a cell or a network slice transmit data of services via the base station, and the base station may form the first feature information based on second feature information of the services of all the UEs. Therefore, the first feature information obtained by the IMF may be sent by an SMF, or may be directly reported by the base station.

It may be understood that, for specific descriptions of the first feature information, refer to the description of step 401 in the embodiment corresponding to FIG. 4. Details are not described herein again.

Step 702. The IMF obtains a first GF resource allocation model corresponding to the first feature information.

It may be understood that, for specific descriptions of the first GF resource allocation model, refer to the description of step 402 in the embodiment corresponding to FIG. 4. Details are not described herein again.

After receiving the first feature information reported by the base station, the IMF may reconstruct or update the model, to obtain a latest first GF resource allocation model, thereby ensuring accuracy of the model.

Step 703. The IMF sends the first GF resource allocation model to the base station.

It may be understood that the IMF may send the first GF resource allocation model to the base station, and the base station determines first GF resource information, to indirectly notify the base station of GF resources corresponding to the cell or the network slice. After obtaining the latest first GF resource allocation model, the IMF delivers the latest first GF resource allocation model to the base station.

Step 704. The base station determines, based on the first GF resource allocation model, the first GF resource information corresponding to the first feature information.

The base station may quickly determine, based on the first GF resource allocation model delivered by the IMF, the first GF resource information corresponding to the current first feature information.

Step 705. The base station obtains the second feature information of the service of the UE.

Step 706. The base station determines a second GF resource allocation model based on the second feature information.

Step 707. The base station determines second GF resource information based on the first GF resource information and the second GF resource allocation model.

Step 708. The base station sends the second GF resource information to the UE.

It may be understood that for specific descriptions of step 705 to step 708, refer to the descriptions of step 404 to step 407 in the embodiment corresponding to FIG. 4. Details are not described herein again.

It may be understood that step 705 and step 706 are performed before step 707, and there is no limitation on a time sequence of any one of step 701 to step 704. This is not specifically limited herein.

In this application, on one hand, the IMF may obtain the first feature information of the service in the cell or on the network slice, and then obtain the latest first GF resource allocation model based on the first feature information. The IMF directly sends the first GF resource allocation model to the base station, and the base station may determine, based on the first GF resource allocation model, the first GF resource information corresponding to the first feature information, to indirectly notify the base station of the GF resources corresponding to the cell or the network slice, and allocate the GF resources to the UE based on the first GF resource information, to perform GF resource allocation in the cell or on the network slice.

On the other hand, the base station may further obtain the second feature information of the service of the UE, and then determine a GF resource requirement of the UE based on the second GF resource allocation model or the second GF resource consumption model. Therefore, the base station may determine, based on the first GF resource information and the GF resource requirement of the UE, the GF resources to be allocated to the UE, and continue to perform GF resource allocation for the UE. Uplink and downlink GF resource allocation meet a GF resource requirement of the cell or the network slice, and may further meet the GF resource requirement of the UE that accesses the cell or the network slice. In addition, effective GF resource utilization can be greatly improved, and a waste of GF resources can be avoided.

It may be understood that, when a management unit of the base station is disposed in the base station, steps related to data processing performed by the base station in FIG. 3, FIG. 4, and FIG. 7 are specifically performed by the management unit of the base station. The IMF may directly send the first GF resource information or the GF resource indication information (including the first GF resource allocation model) to the management unit of the base station. Data processing is performed by the management unit of the base station, to obtain the second GF resource information. Then the management unit of the base station sends the second GF resource information to the base station, and the base station delivers the second GF resource information to the UE. Alternatively, after receiving the first GF resource information or the GF resource indication information delivered by the IMF, the base station forwards the first GF resource information or the GF resource indication information to the management unit of the base station, and the management unit of the base station processes the first GF resource information or the GF resource indication information to obtain the second GF resource information, and then sends the second GF resource information to the base station; and the base station delivers the second GF resource information to the UE. This is not specifically limited herein.

For data processing performed by the management unit of the base station, refer to the content of the corresponding embodiments in FIG. 3, FIG. 4, and FIG. 7. Details are not described herein again.

Figure 8:
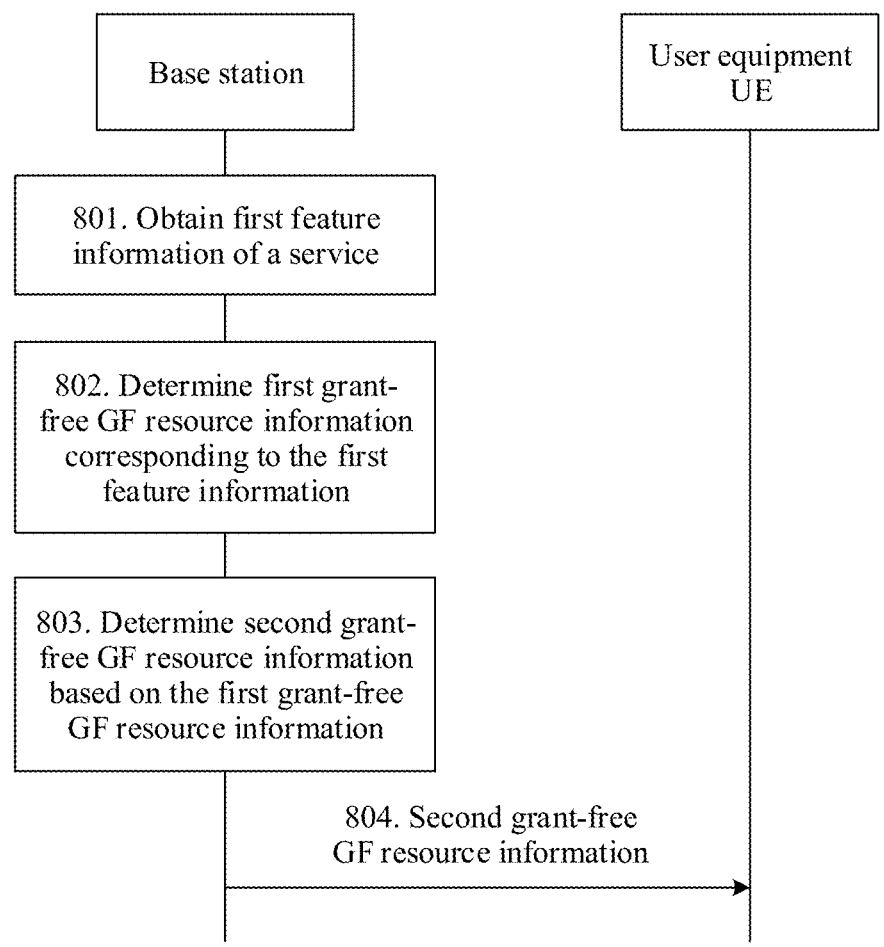
FIG. 8 is a schematic diagram of another embodiment of a GF resource allocation method according to this application.

When the IMF is integrated into the base station, or the base station performs an action performed by the IMF, FIG. 8 is a schematic diagram of another embodiment of a GF resource allocation method according to this application. Specifically, the method includes the following steps.

Step 801. A base station obtains first feature information of a service.

It may be understood that UEs that access a cell or a network slice transmit data of services via the base station, and the base station may form the first feature information based on second feature information of the services of all the UEs.

It may be understood that, for specific descriptions of the first feature information, refer to the description of step 401 in the embodiment corresponding to FIG. 4. Details are not described herein again.

Step 802. The base station determines first GF resource information corresponding to the first feature information.

The first GF resource information is used to describe GF resources corresponding to the cell or GF resources corresponding to the network slice, the cell corresponds to the base station, and the network slice corresponds to the base station.

After obtaining the first feature information, the base station may adjust, in real time based on the first feature information, the GF resources corresponding to the cell or the network slice, to determine the first GF resource information.

Step 803. The base station determines second GF resource information based on the first GF resource information.

The second GF resource information is used to describe GF resources to be allocated to the UE.

The base station may allocate, based on the GF resources corresponding to the cell or the GF resources corresponding to the network slice that are described in the first GF resource information, the GF resources to the UE that accesses the cell or the network slice.

The GF resources described in the second GF resource information may be the same as those described in the first GF resource information; or the GF resources described in the second GF resource information may be obtained by equally dividing the GF resources described in the first GF resource information by a quantity of UEs; or the GF resources described in the second GF resource information may be obtained by allocating the GF resources described in the first GF resource information in another allocation manner. This is not specifically limited herein.

Step 804. The base station sends the second GF resource information to the UE.

After determining the second GF resource information, the base station may send the second GF resource information to the UE, so that the UE may transmit the data of the GF service on the GF resources described in the second GF resource information.

In this application, an autonomous learning capability of the base station is fully used. The base station obtains the first feature information of the service in the cell or on the network slice; and then determines the first GF resource information based on the first feature information, dynamically adjusts the GF resources corresponding to the cell or the network slice that are described in the first GF resource information, and determines, based on the first GF resource information, the GF resources to be allocated to the UE. The setting not only can meet a GF resource requirement of the GF service in the cell or on the network slice, but also can avoid a waste of GF resources in the cell or on the network slice. In this way, proper allocation and dynamic allocation of the GF resources in the cell or on the network slice are implemented.

Figure 9:
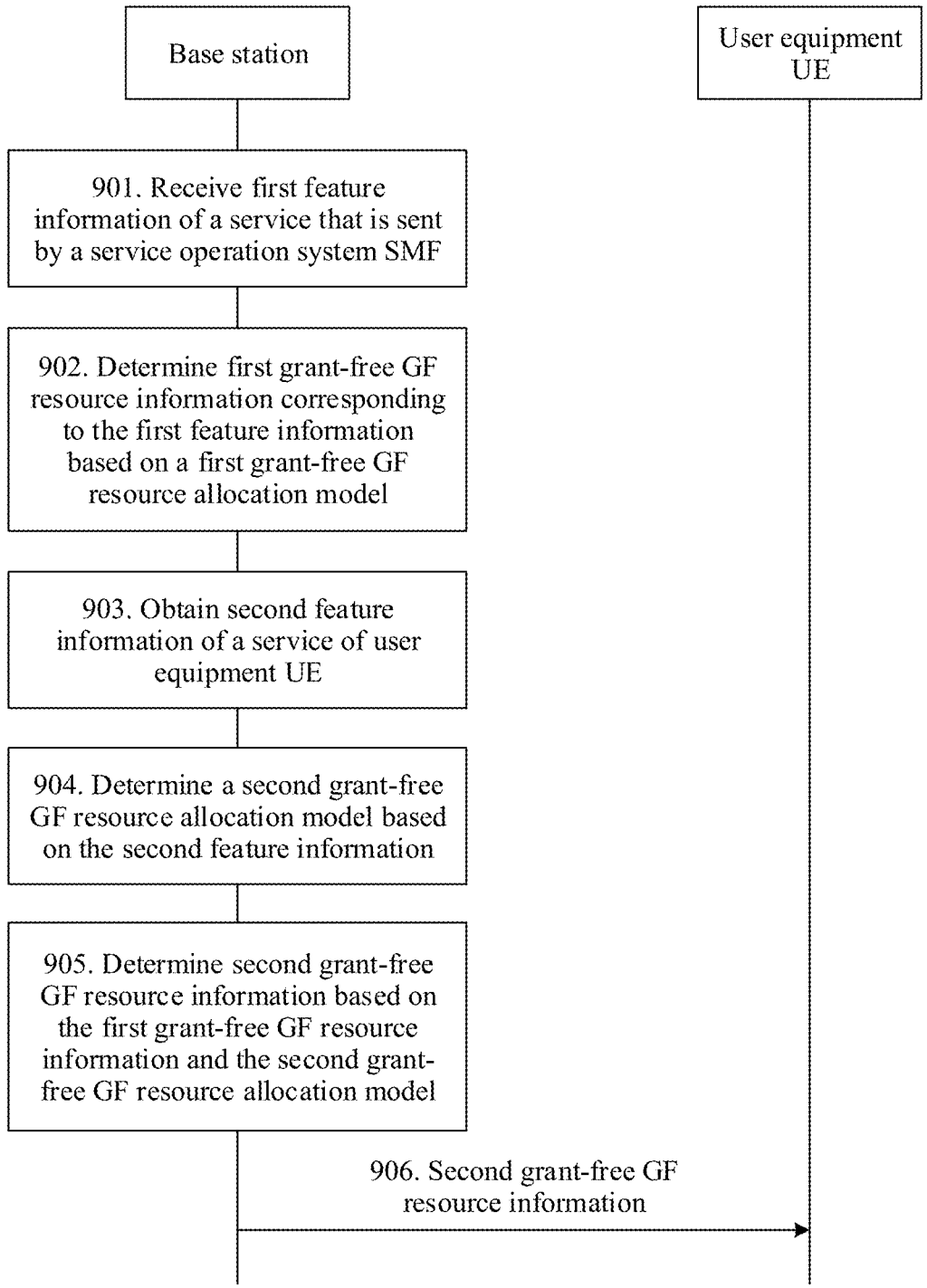
FIG. 9 is a schematic diagram of another embodiment of a GF resource allocation method according to this application.

FIG. 9 is a schematic diagram of another embodiment of a GF resource according to this application. Specifically, the method includes the following steps.

Step 901. A base station receives first feature information of a service sent by an SMF.

It may be understood that UEs that access a cell or a network slice transmit data of services via the base station, and the base station may form the first feature information based on second feature information of the services of all the UEs. The first feature information may be locally stored by the base station, and may be further stored and delivered by the SMF, to reduce storage work of the base station for the first feature information.

It may be understood that, for specific descriptions of the SMF and the first feature information, refer to the description of step 401 in the embodiment corresponding to FIG. 4. Details are not described herein again.

Step 902. The base station determines, based on a first GF resource allocation model, first GF resource information corresponding to the first feature information.

The first GF resource allocation model includes GF resources to be allocated in different time periods to all the UEs that access the cell or the network slice. It may be understood that for specific descriptions of step 902, refer to the description of step 402 in the embodiment corresponding to FIG. 4. Details are not described herein again.

Step 903. The base station obtains the second feature information of the service of the UE.

Step 904. The base station determines a second GF resource allocation model based on the second feature information.

Step 905. The base station determines second GF resource information based on the first GF resource information and the second GF resource allocation model.

Step 906. The base station sends the second GF resource information to the UE.

It may be understood that for specific descriptions of step 903 to step 906, refer to the descriptions of step 404 to step 407 in the embodiment corresponding to FIG. 4. Details are not described herein again.

In this application, on one hand, the base station may obtain the first feature information of the GF service in the cell or on the network slice, and then determine, based on the first GF resource allocation model or a first GF resource consumption model, the first GF resource information corresponding to the first feature information, where the first GF resource information is used to describe GF resources corresponding to the cell or GF resources corresponding to the network slice, so that GF resource allocation may be performed for the UE based on the first GF resource information, to perform GF resource allocation in the cell or on the network slice.

On the other hand, the base station may further obtain the second feature information of the service of the UE, and then determine a GF resource requirement of the UE based on the second GF resource allocation model or a second GF resource consumption model. Therefore, the base station may determine, based on the first GF resource information and the GF resource requirement of the UE, the GF resources to be allocated to the UE, and continue to perform GF resource allocation for the UE. Uplink and downlink GF resource allocation meet a GF resource requirement of the cell or the network slice, and may further meet the GF resource requirement of the UE that accesses the cell or the network slice. In addition, effective GF resource utilization can be greatly improved, and a waste of GF resources can be avoided.

It may be understood that, when a management unit of the base station is disposed in the base station, steps related to data processing performed by the base station in FIG. 8 and FIG. 9 are specifically performed by the management unit of the base station. After data processing is performed by the management unit of the base station, the second GF resource information is obtained and then sent to the base station, and the base station delivers the second GF resource information to the UE.

For data processing performed by the management unit of the base station, refer to the content of the corresponding embodiments in FIG. 3, FIG. 4, and FIG. 7. Details are not described herein again.

The foregoing describes the GF resource allocation method provided in this application, and the following describes, from a perspective of a functional module, the IMF, the base station, and the management unit of the base station that are provided in this application.

Figure 10:
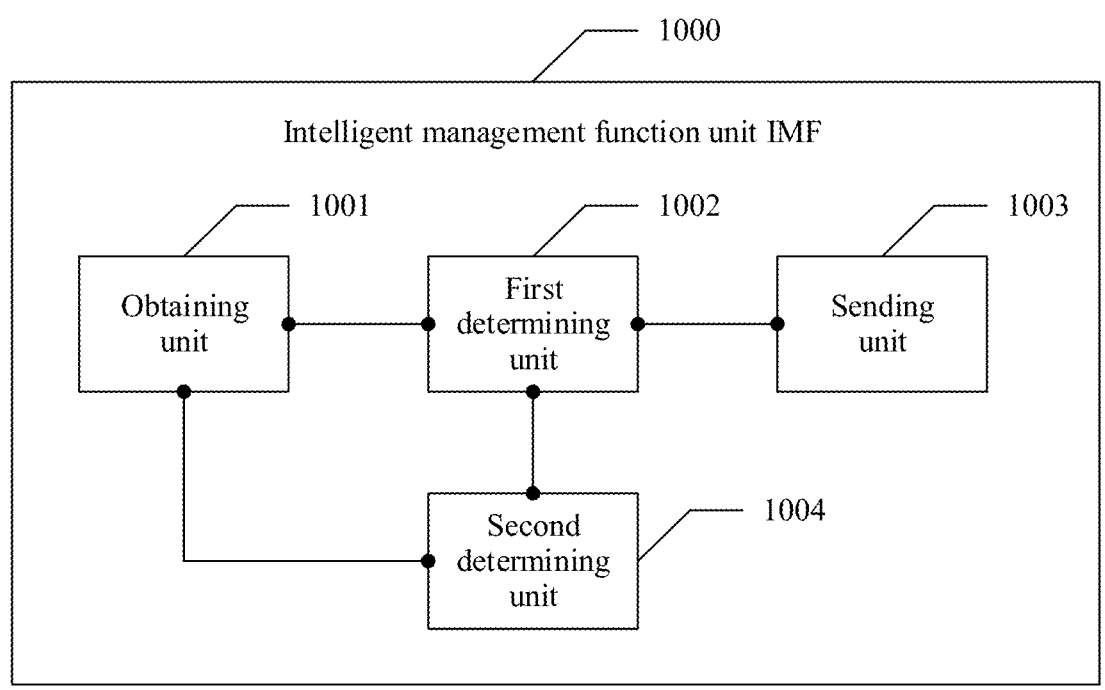
FIG. 10 is a schematic diagram of an embodiment of an IMF according to this application.

FIG. 10 is a schematic diagram of an embodiment of an IMF according to this application. Specifically, the IMF 1000 includes:

an obtaining unit 1001, configured to obtain feature information of a service;

a first determining unit 1002, configured to determine GF resource information corresponding to the feature information or GF resource indication information corresponding to the feature information; and a sending unit 1003, configured to send the GF resource information or the GF resource indication information to a base station or a management unit of a base station, where the GF resource information is used to describe GF resources corresponding to a cell or GF resources corresponding to a network slice, the cell corresponds to the base station, and the network slice corresponds to the base station; and the GF resource indication information is used to indicate the base station to determine the GF resource information or indicate the management unit to determine the GF resource information.

Further, the GF resource indication information may specifically include a GF resource allocation model corresponding to the cell or the network slice, and the GF resource allocation model includes GF resources to be allocated in different time periods to all UEs that access the cell or the network slice.

Further, the obtaining unit 1001 may be specifically configured to receive the feature information sent by a service management function unit (SMF); and/or receive, by the IMF, the feature information sent by the base station.

Further, the IMF 1000 further includes:

a second determining unit 1004, configured to determine a GF resource consumption model based on the feature information, where the GF resource consumption model includes GF resources that have been used in different time periods by all UEs that access the cell or the network slice; and the first determining unit 1002 may be specifically configured to determine, based on the GF resource consumption model, GF resource requirements of all the UEs that access the cell or the network slice, thereby determining the GF resource information.

Further, the feature information may specifically include one or more of the following information: a quantity of UEs, a service type, a quantity of service requests, a service request interval, and a data packet size, to represent a service in the cell or on the network slice.

Figure 11:
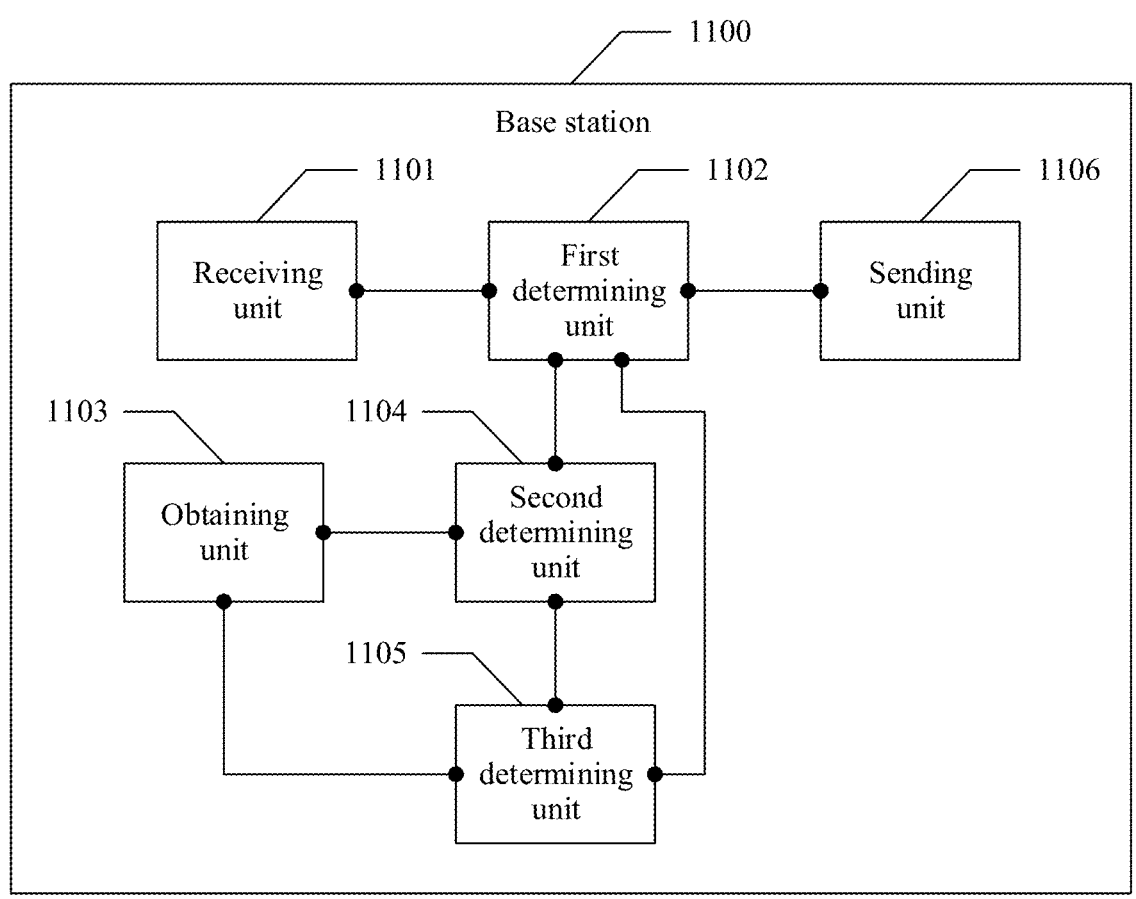
FIG. 11 is a schematic diagram of an embodiment of a base station according to this application.

FIG. 11 is a schematic diagram of an embodiment of a base station according to this application. Specifically, the base station 1100 includes:

a receiving unit 1101, configured to receive first GF resource information or GF resource indication information sent by an IMF, where the GF resource information is used to describe GF resources corresponding to a cell or GF resources corresponding to a network slice, the cell corresponds to the base station, and the network slice corresponds to the base station; and the GF resource indication information is used to indicate the base station to determine the first GF resource information; and a first determining unit 1102, configured to determine, based on the first GF resource information or the GF resource indication information, GF resources to be allocated to UE, where the UE corresponds to the cell, or the UE corresponds to the network slice.

Further, the GF resource indication information may specifically include a first GF resource allocation model corresponding to the cell or the network slice, where the first GF resource allocation model includes GF resources to be allocated in different time periods to all UEs that access the cell or the network slice; and the first determining unit 1102 may be specifically configured to determine the first GF resource information based on the first GF resource allocation model; and determine, based on the first GF resource information, the GF resources to be allocated to the UE.

Further, the base station 1100 may further include:

an obtaining unit 1103, configured to obtain feature information of a service of the UE; and a second determining unit 1104, configured to determine, based on the feature information, a second GF resource allocation model corresponding to the UE, where the second GF resource allocation model includes the GF resources to be allocated to the UE in different time periods; and the first determining unit 1102 may be specifically configured to determine, based on the first GF resource information and the second GF resource allocation model, the GF resources to be allocated to the UE.

Further, the base station 1100 may further include:

a third determining unit 1105, configured to determine, based on the feature information, a GF resource consumption model corresponding to the UE, where the GF resource consumption model includes GF resources that have been used in different time periods by the UE; and the first determining unit 1102 may be specifically configured to determine, based on the first GF resource information and the GF resource consumption model, the GF resources to be allocated to the UE; and the second determining unit 1104 may be specifically configured to determine, based on the feature information and the GF resource consumption model, the second GF resource allocation model.

Further, the feature information may specifically include one or more of the following information: a service type, a quantity of service requests, a service request interval, and a data packet size.

Further, the base station 1100 may further include:

a sending unit 1106, configured to send the second GF resource information to the UE, where the second GF resource information is used to describe the GF resources to be allocated to the UE.

Figure 12:
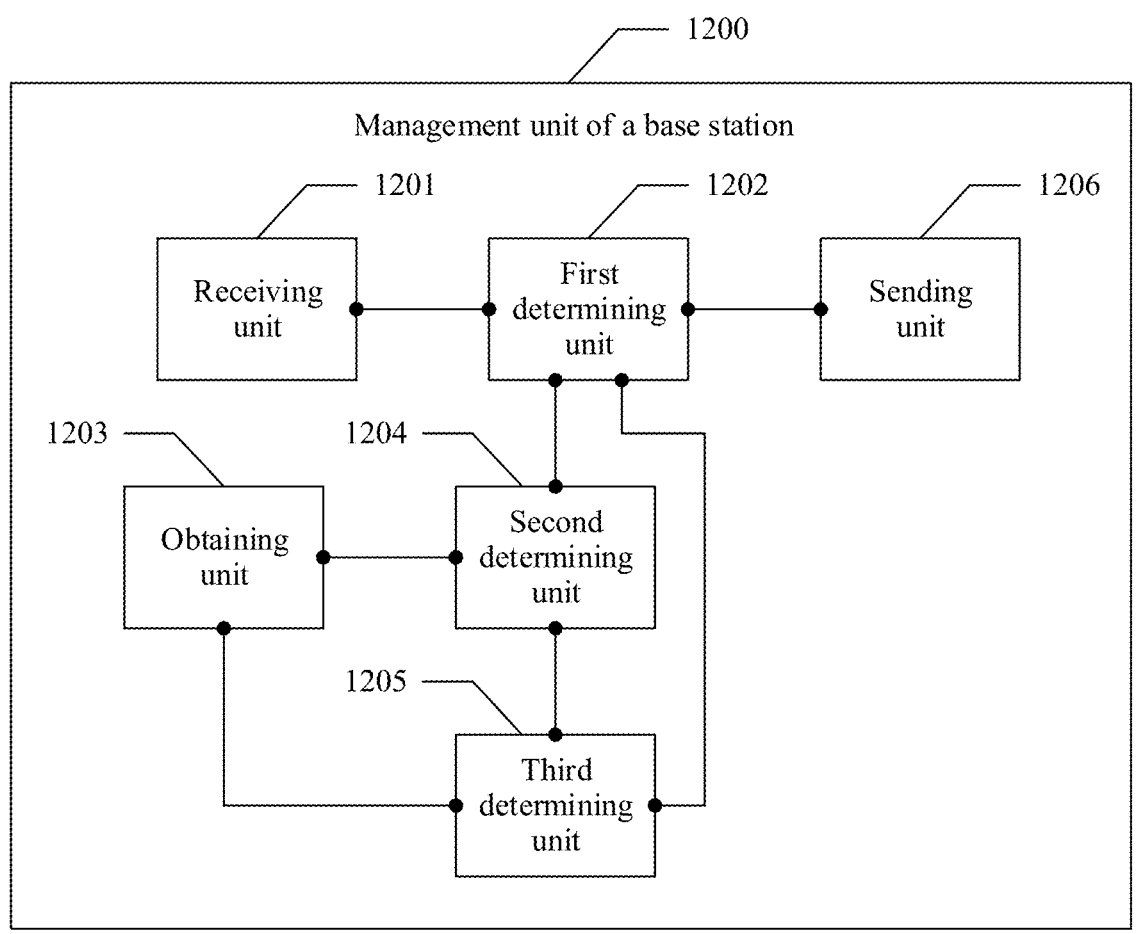
FIG. 12 is a schematic diagram of an embodiment of a management unit of a base station according to this application.

FIG. 12 is a schematic diagram of an embodiment of a management unit of a base station according to this application. Specifically, the management unit 1200 of the base station includes:

a receiving unit 1201, configured to receive first GF resource information or GF resource indication information sent by an IMF, where the GF resource information is used to describe GF resources corresponding to a cell or GF resources corresponding to a network slice, the cell corresponds to the base station, and the network slice corresponds to the base station; and the GF resource indication information is used to indicate the base station to determine the first GF resource information; and a first determining unit 1202, configured to determine, based on the first GF resource information or the GF resource indication information, GF resources to be allocated to UE, where the UE corresponds to the cell, or the UE corresponds to the network slice.

Further, the GF resource indication information may specifically include a first GF resource allocation model corresponding to the cell or the network slice, where the first GF resource allocation model includes GF resources to be allocated in different time periods to all UEs that access the cell or the network slice; and the first determining unit 1202 may be specifically configured to determine the first GF resource information based on the first GF resource allocation model; and determine, based on the first GF resource information, the GF resources to be allocated to the UE.

Further, the management unit 1200 of the base station may further include:

an obtaining unit 1203, configured to obtain feature information of a service of the UE; and a second determining unit 1104, configured to determine, based on the feature information, a second GF resource allocation model corresponding to the UE, where the second GF resource allocation model includes the GF resources to be allocated to the UE in different time periods; and the first determining unit 1202 may be specifically configured to determine, based on the first GF resource information and the second GF resource allocation model, the GF resources to be allocated to the UE.

Further, the management unit 1200 of the base station may further include:

a third determining unit 1205, configured to determine, based on the feature information, a GF resource consumption model corresponding to the UE, where the GF resource consumption model includes GF resources that have been used in different time periods by the UE; and the first determining unit 1202 may be specifically configured to determine, based on the first GF resource information and the GF resource consumption model, the GF resources to be allocated to the UE; and the second determining unit 1204 may be specifically configured to determine, based on the feature information and the GF resource consumption model, the second GF resource allocation model.

Further, the feature information may specifically include one or more of the following information: a service type, a quantity of service requests, a service request interval, and a data packet size.

Further, the management unit 1200 of the base station may further include:

a sending unit 1206, configured to send the second GF resource information to the base station, where the second GF resource information is used to describe the GF resources to be allocated to the UE.

Figure 13:
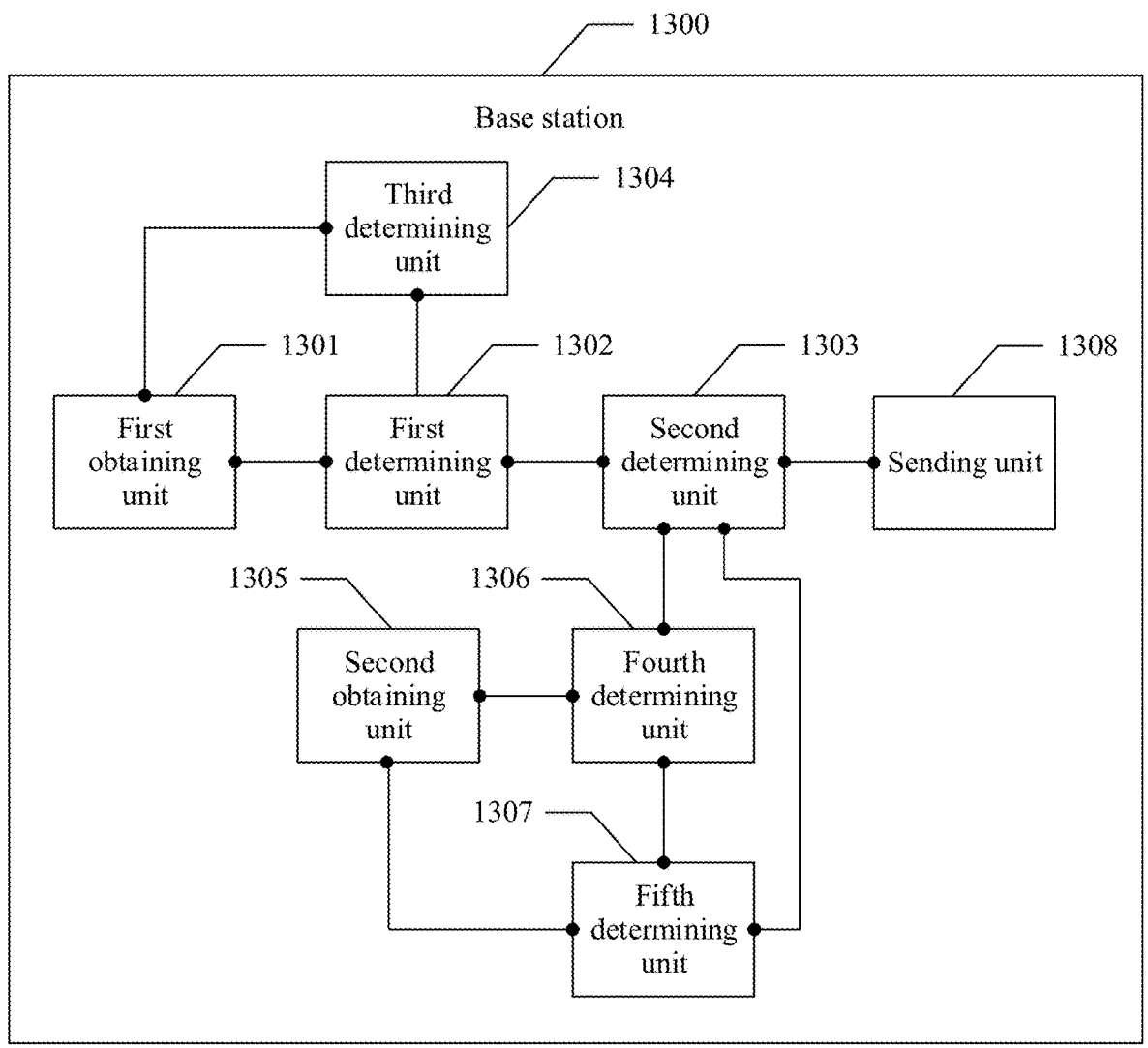
FIG. 13 is a schematic diagram of another embodiment of a base station according to this application.

FIG. 13 is a schematic diagram of an embodiment of a base station according to this application. Specifically, the base station 1300 includes:

a first obtaining unit 1301, configured to obtain first feature information of a service;

a first determining unit 1302, configured to determine first GF resource information corresponding to the first feature information, where the first GF resource information is used to describe GF resources corresponding to a cell or GF resources corresponding to a network slice, the cell corresponds to the base station, and the network slice corresponds to the base station; and a second determining unit 1303, configured to determine, based on the first GF resource information, GF resources to be allocated to UE, where the UE corresponds to the cell, or the UE corresponds to the network slice.

Further, the first determining unit 1302 may be specifically configured to determine the first GF resource information based on a first GF resource allocation model, where the first GF resource allocation model includes GF resources to be allocated in different time periods to all UEs that access the cell or the network slice.

Further, the base station 1300 may further include:

a third determining unit 1304, configured to determine a first GF resource consumption model based on the first feature information, where the first GF resource consumption model includes GF resources that have been used in different time periods by all the UEs that access the cell or the network slice; and the first determining unit 1302 may be specifically configured to determine, based on the first GF resource consumption model, a GF resource requirement of the cell or a GF resource requirement of the network slice, thereby determining the first GF resource information.

Further, the first feature information may specifically include one or more of the following information: a quantity of UEs, a first service type, a quantity of first service requests, a first service request interval, and a first data packet size, to represent a service in the cell or on the network slice.

Further, the base station 1300 may further include:

a second obtaining unit 1305, configured to obtain second feature information of the service of the UE; and a fourth determining unit 1306, configured to determine, based on the second feature information, a second GF resource allocation model corresponding to the UE, where the second GF resource allocation model includes the GF resources to be allocated to the UE in different time periods; and the second determining unit 1303 may be specifically configured to determine, based on the first GF resource information and the second GF resource allocation model, the GF resources to be allocated to the UE.

Further, the base station 1300 may further include:

a fifth determining unit 1307, configured to determine, based on the second feature information, a second GF resource consumption model corresponding to the UE, where the GF resource consumption model includes GF resources that have been used in different time periods by the UE; and the second determining unit 1303 may be specifically configured to determine, based on the first GF resource information and the second GF resource consumption model, the GF resources to be allocated to the UE; or the fourth determining unit 1306 may be specifically configured for the base station to determine, based on the second feature information and the second GF resource consumption model, the second GF resource allocation model.

Further, the second feature information may specifically include one or any combination of the following information: a second service type, a quantity of second service requests, a second service request interval, and a second data packet size, to represent the service of the UE.

Further, the base station 1300 may further include:

a sending unit 1308, configured to send second GF resource information to the UE, where the second GF resource information is used to describe the GF resources to be allocated to the UE.

Figure 14:
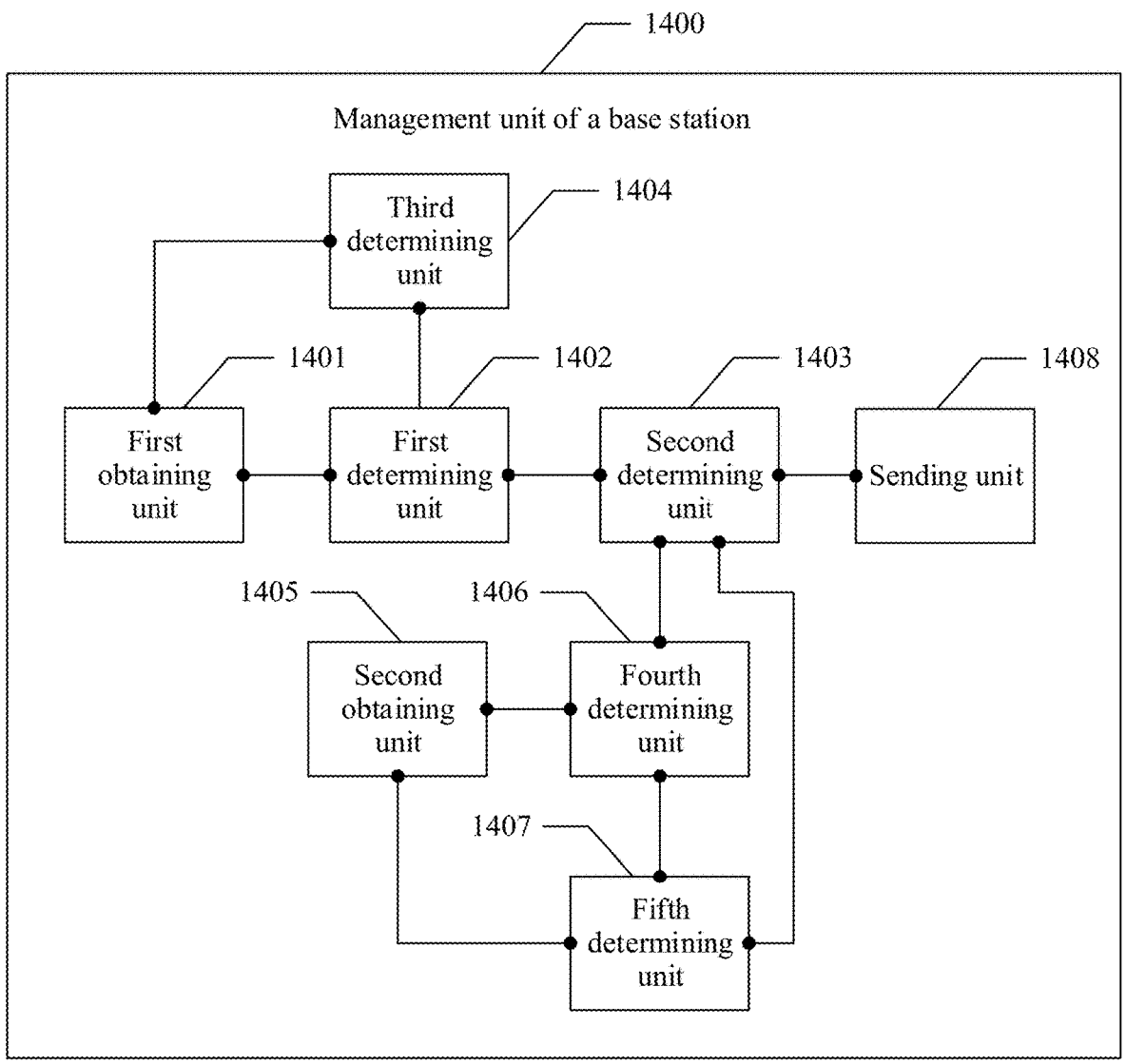
FIG. 14 is a schematic diagram of another embodiment of a management unit of a base station according to this application.

FIG. 14 is a schematic diagram of an embodiment of a management unit of a base station according to this application. Specifically, the management unit 1400 of the base station includes:

a first obtaining unit 1401, configured to obtain first feature information of a service;

a first determining unit 1402, configured to determine first GF resource information corresponding to the first feature information, where the first GF resource information is used to describe GF resources corresponding to a cell or GF resources corresponding to a network slice, the cell corresponds to the base station, and the network slice corresponds to the base station; and a second determining unit 1403, configured to determine, based on the first GF resource information, GF resources to be allocated to UE, where the UE corresponds to the cell, or the UE corresponds to the network slice.

Further, the first determining unit 1402 may be specifically configured to determine the first GF resource information based on a first GF resource allocation model, where the first GF resource allocation model includes GF resources to be allocated in different time periods to all UEs that access the cell or the network slice.

Further, the management unit 1400 of the base station may further include:

a third determining unit 1404, configured to determine a first GF resource consumption model based on the first feature information, where the first GF resource consumption model includes GF resources that have been used in different time periods by all the UEs that access the cell or the network slice; and the first determining unit 1402 may be specifically configured to determine, based on the first GF resource consumption model, a GF resource requirement of the cell or a GF resource requirement of the network slice, thereby determining the first GF resource information.

Further, the first feature information may specifically include one or more of the following information: a quantity of UEs, a first service type, a quantity of first service requests, a first service request interval, and a first data packet size, to represent a service in the cell or on the network slice.

Further, the management unit 1400 of the base station may further include:

a second obtaining unit 1405, configured to obtain second feature information of the service of the UE; and a fourth determining unit 1406, configured to determine, based on the second feature information, a second GF resource allocation model corresponding to the UE, where the second GF resource allocation model includes the GF resources to be allocated to the UE in different time periods; and the second determining unit 1403 may be specifically configured to determine, based on the first GF resource information and the second GF resource allocation model, the GF resources to be allocated to the UE.

Further, the base station 1400 may further include:

a fifth determining unit 1407, configured to determine, based on the second feature information, a second GF resource consumption model corresponding to the UE, where the GF resource consumption model includes GF resources that have been used in different time periods by the UE; and the second determining unit 1403 may be specifically configured to determine, based on the first GF resource information and the second GF resource consumption model, a GF resource requirement of the UE, thereby determining the GF resources to be allocated to the UE; or the fourth determining unit 1406 may be specifically configured for the base station to determine, based on the second feature information and the second GF resource consumption model, the second GF resource allocation model.

Further, the second feature information may specifically include one or any combination of the following information: a second service type, a quantity of second service requests, a second service request interval, and a second data packet size, to represent the service of the UE.

Further, the management unit 1400 of the base station may further include:

a sending unit 1408, configured to send the second GF resource information to the base station, where the second GF resource information is used to describe the GF resources to be allocated to the UE.

Next, the following further describes, from a perspective of a hardware entity, the IMF, the base station, and the management unit of the base station that are provided in this application.

Figure 15:
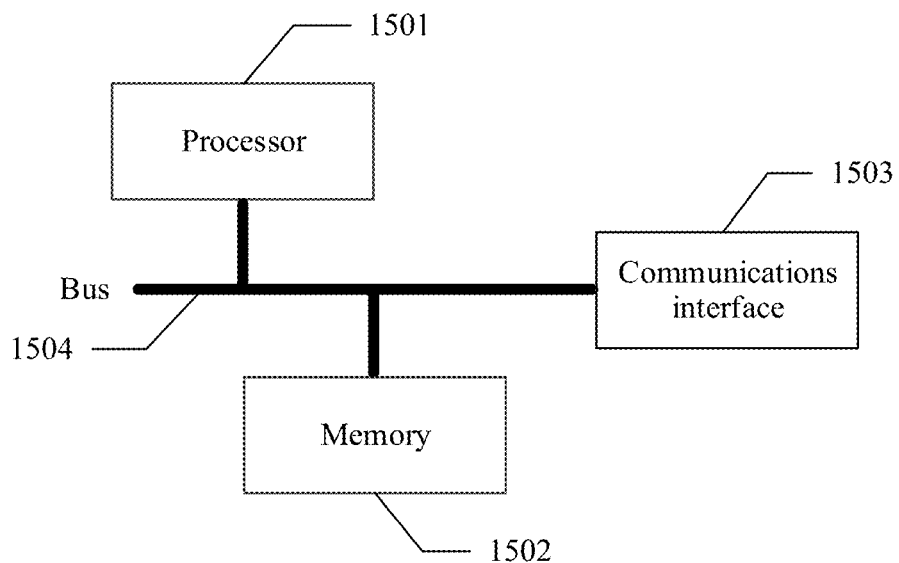
FIG. 15 is a schematic diagram of another embodiment of an IMF according to this application.

FIG. 15 is a schematic structural diagram of an IMF according to this application. The IMF may include one or more processors 1501, a memory 1502, and a communications interface 1503.

The processor 1501, the memory 1502, and the communications interface 1503 are connected to each other through the bus 1504. The bus 1504 may be classified into an address bus, a data bus, a control bus, and the like. For ease of representation, only one thick line is used to represent the bus in FIG. 15, but this does not mean that there is only one bus or only one type of bus.

The communications interface 1503 may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be a WLAN interface, a cellular network communications interface, a combination thereof, or the like.

The memory 1502 may be configured to store the first feature information, the first GF resource information, the GF resource indication information, the first GF resource allocation model, and the first GF resource consumption model.

The memory 1502 may include a volatile memory, for example, a random-access memory (RAM); or the memory 1502 may include a non-volatile memory, for example, a flash memory, a hard disk drive (HDD), or a solid-state drive (SSD); or the memory 1502 may include a combination of the foregoing types of memories.

The processor 1501 may be a central processing unit (CPU), a network processor (NP), or a combination of a CPU and an NP. The processor 1501 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

Optionally, the memory 1502 is further configured to store a program instruction, and the processor 1501 invokes the program instruction stored in the memory 1502, to perform the operations of the IMF in the GF resource allocation method shown in FIG. 3, FIG. 4, or FIG. 7 in this application.

Figure 16:
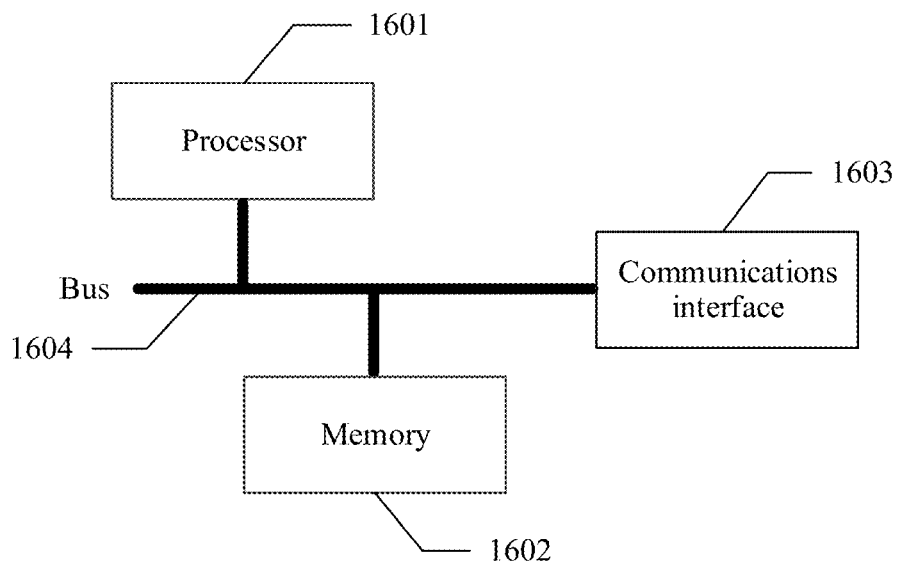
FIG. 16 is a schematic diagram of another embodiment of a base station according to this application.

FIG. 16 is a schematic structural diagram of a base station according to this application. The base station may include one or more processors 1601, a memory 1602, and a communications interface 1603.

The processor 1601, the memory 1602, and the communications interface 1603 are connected to each other through the bus 1604. The bus 1604 may be classified into an address bus, a data bus, a control bus, and the like. For ease of representation, only one thick line is used to represent the bus in FIG. 16, but this does not mean that there is only one bus or only one type of bus.

The communications interface 1603 may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be a WLAN interface, a cellular network communications interface, a combination thereof, or the like.

The memory 1602 is configured to store the first feature information, the second feature information, the first GF resource information, the second GF resource information, the GF resource indication information, the first GF resource allocation model, the second GF resource allocation model, the first GF resource consumption model, and the second GF resource consumption model.

The memory 1602 may include a volatile memory, for example, a RAM; or the memory 1602 may include a non-volatile memory, for example, a flash memory, an HDD, or an SSD; or the memory 1502 may include a combination of the foregoing types of memories.

The processor 1601 may be a CPU, an NP, or a combination of a CPU and an NP. The processor 1601 may further include a hardware chip. The hardware chip may be an ASIC, a PLD, or a combination thereof. The PLD may be a CPLD, an FPGA, a GAL, or any combination thereof.

Figure 17:
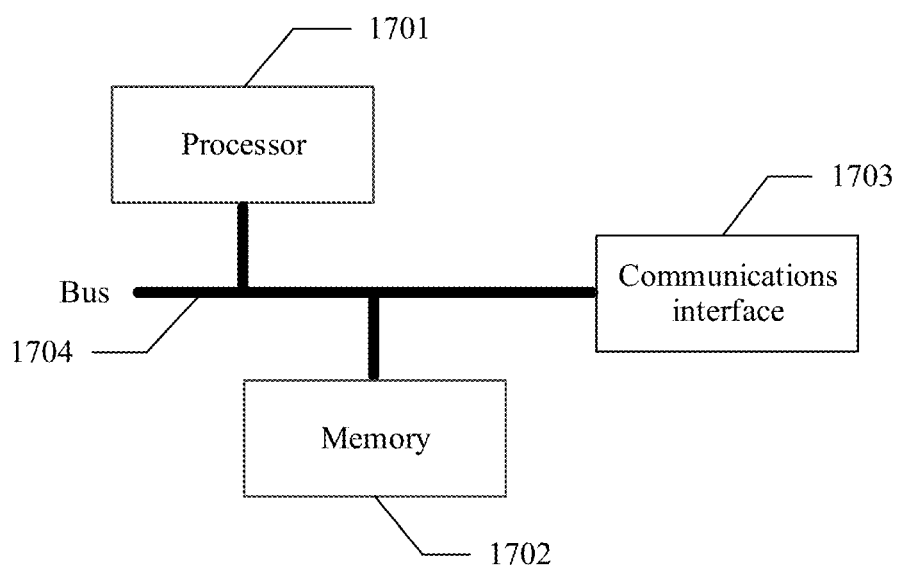
FIG. 17 is a schematic diagram of another embodiment of a management unit of a base station according to this application.

Optionally, the memory 1602 is further configured to store a program instruction, and the processor 1601 invokes the program instruction stored in the memory 1602, to perform the operations of the base station in the GF resource allocation method shown in FIG. 3, FIG. 4, FIG. 7, FIG. 8, or FIG. 9 in this application. FIG. 17 is a schematic structural diagram of a management unit of a base station according to this application. The management unit of the base station may include one or more processors 1701, a memory 1702, and a communications interface 1703.

The processor 1701, the memory 1702, and the communications interface 1703 are connected to each other through the bus 1704. The bus 1704 may be classified into an address bus, a data bus, a control bus, and the like. For ease of representation, only one thick line is used to represent the bus in FIG. 17, but this does not mean that there is only one bus or only one type of bus.

The communications interface 1703 may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be a WLAN interface, a cellular network communications interface, a combination thereof, or the like.

The memory 1702 is configured to store the first feature information, the second feature information, the first GF resource information, the second GF resource information, the GF resource indication information, the first GF resource allocation model, the second GF resource allocation model, the first GF resource consumption model, and the second GF resource consumption model.

The memory 1702 may include a volatile memory, for example, a RAM; or the memory 1702 may include a non-volatile memory, for example, a flash memory, an HDD, or an SSD; or the memory 1702 may include a combination of the foregoing types of memories.

The processor 1701 may be a CPU, an NP, or a combination of a CPU and an NP. The processor 1701 may further include a hardware chip. The hardware chip may be an ASIC, a PLD, or a combination thereof. The PLD may be a CPLD, an FPGA, a GAL, or any combination thereof.

Optionally, the memory 1702 is further configured to store a program instruction, and the processor 1701 invokes the program instruction stored in the memory 1602, to perform the operations of the base station in the GF resource allocation method shown in FIG. 3, FIG. 4, FIG. 7, FIG. 8, or FIG. 9 in this application.

After obtaining the second GF resource information, the management unit of the base station sends the second GF resource information to the base station, and the base station delivers the second GF resource information to the UE.

This application further provides a computer-readable storage medium. The computer-readable storage medium includes an instruction, and when the instruction is run on an IMF, the IMF is enabled to perform the method performed by the IMF in the embodiment corresponding to FIG. 3, FIG. 4, or FIG. 7.

This application further provides a computer-readable storage medium. The computer-readable storage medium includes an instruction, and when the instruction is run on a base station, the base station is enabled to perform the method performed by the base station in the embodiment corresponding to FIG. 3, FIG. 4, FIG. 7, FIG. 8, or FIG. 9.

This application further provides a computer-readable storage medium. The computer-readable storage medium includes an instruction, and when the instruction is run on a management unit of a base station, the management unit of the base station is enabled to perform the method performed by the base station in the embodiment corresponding to FIG. 3, FIG. 4, FIG. 7, FIG. 8, or FIG. 9.

After obtaining the second GF resource information, the management unit of the base station sends the second GF resource information to the base station, and the base station delivers the second GF resource information to the UE.

This application further provides a computer program product. The computer program product includes a computer software instruction, and when the computer software instruction is run on an IMF, the IMF is enabled to perform the method performed by the IMF in the embodiment corresponding to FIG. 3, FIG. 4, or FIG. 7.

This application further provides a computer program product. The computer program product includes a computer software instruction, and when the computer software instruction is run on a base station, the base station is enabled to perform the method performed by the base station in the embodiment corresponding to FIG. 3, FIG. 4, FIG. 7, FIG. 8, or FIG. 9.

This application further provides a computer program product. The computer program product includes a computer software instruction, and when the computer software instruction is run on a management unit of a base station, the management unit of the base station is enabled to perform the method performed by the base station in the embodiment corresponding to FIG. 3, FIG. 4, FIG. 7, FIG. 8, or FIG. 9.

After obtaining the second GF resource information, the management unit of the base station sends the second GF resource information to the base station, and the base station delivers the second GF resource information to the UE.

It may be understood that, persons skilled in the art may clearly understand that, for the purpose of convenient and brief description, for the detailed working processes of the IMF, the base station, the management unit of the base station, and the corresponding unit, refer to corresponding processes in the method embodiments corresponding to FIG. 3, FIG. 4, FIG. 7, FIG. 8 and FIG. 9. Details are not described herein again.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods in the embodiments of this application. The foregoing storage medium includes: any medium that can store program code, for example, a USB flash drive, a removable hard disk, a read-only memory (ROM), a RAM, a magnetic disk, or an optical disc.

The foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A grant-free (GF) resource allocation method, comprising:
   obtaining, by an intelligent management function unit (IMF), feature information of a service;
   determining, by the IMF, GF resource indication information corresponding to the feature information, wherein the GF resource indication information comprises a GF resource allocation model corresponding to a cell or a network slice, and wherein the GF resource allocation model comprises GF resources to be allocated in different time periods to a plurality of user equipment (UE) that access the cell or the network slice; and
   sending, by the IMF, the GF resource indication information to a base station or a management unit of the base station, wherein the base station corresponds to the cell or the network slice, and wherein the GF resource indication information is used to indicates the base station to determine GF resources corresponding to the cell or GF resources corresponding to the network slice based on the GF resource indication information.

2. The GF resource allocation method according to claim 1, wherein the obtaining, by an IMF, feature information of a service comprises:
   receiving, by the IMF, the feature information sent by a service management function unit (SMF); or
   receiving, by the IMF, the feature information sent by the base station.

3. The GF resource allocation method according to claim 1, wherein the feature information comprises one or more of the following information:
   a quantity of UEs, a service type, a quantity of service requests, a service request interval, and a data packet size.

4. An intelligent management function unit (IMF), comprising:
   at least one processor; and
   one or more memories coupled to the at least one processor and storing programming instructions for execution by the at least one processor, the programming instructions instruct the at least one processor to:
   obtain feature information of a service;
   determine grant-free (GF) resource indication information corresponding to the feature information, wherein the GF resource indication information comprises a GF resource allocation model corresponding to a cell or a network slice, and wherein the GF resource allocation model comprises GF resources to be allocated in different time periods to a plurality of user equipment (UE) that access the cell or the network slice; and
   send the GF resource indication information to a base station or a management unit of the base station, wherein the base station corresponds to the cell or the network slice, and wherein the GF resource indication information is used to indicates the base station to determine GF resources corresponding to the cell or GF resources corresponding to the network slice based on the GF resource indication information.

5. The IMF according to claim 4, wherein the programming instructions further instruct the at least one processor to:
   receive the feature information sent by a service management function unit (SMF); or
   receive the feature information sent by the base station.

6. The IMF according to claim 4, wherein the feature information comprises one or more of the following information:
   a quantity of UEs, a service type, a quantity of service requests, a service request interval, and a data packet size.

7. One or more non-transitory computer-readable media storing computer instructions, that when executed by one or more processors, cause a computing device to perform operations comprising:
   obtaining, by an intelligent management function unit (IMF), feature information of a service;
   determining, by the IMF, GF resource indication information corresponding to the feature information, wherein the GF resource indication information comprises a GF resource allocation model corresponding to a cell or a network slice, and wherein the GF resource allocation model comprises GF resources to be allocated in different time periods to a plurality of user equipment (UE) that access the cell or the network slice; and
   sending, by the IMF, the GF resource indication information to a base station or a management unit of the base station, wherein the base station corresponds to the cell or the network slice, and wherein the GF resource indication information indicates the base station to determine GF resources corresponding to the cell or GF resources corresponding to the network slice based on the GF resource indication information.

8. The one or more non-transitory computer-readable media according to claim 7, wherein the obtaining, by an IMF, feature information of a service comprises:
   receiving, by the IMF, the feature information sent by a service management function unit (SMF); or receiving, by the IMF, the feature information sent by the base station.

9. The one or more non-transitory computer-readable media according to claim 7, wherein the feature information comprises one or more of the following information:
   a quantity of UEs, a service type, a quantity of service requests, a service request interval, and a data packet size.

* * * * *

UNITED STATES PATENT AND TRADEMARK OFFICE
CERTIFICATE OF CORRECTION

PATENT NO. : 11,877,282 B2
APPLICATION NO. : 17/159822
DATED : January 16, 2024
INVENTOR(S) : Gaoquan Lin and Ruiyue Xu Page 1 of 1

It is certified that error appears in the above-identified patent and that said Letters Patent is hereby corrected as shown below:

In the Claims

Column 37, Line 41, Claim 1, after "information" please delete "is used to";

Column 38, Line 13, Claim 4, after "information" please delete "is used to".

Signed and Sealed this
Fourth Day of June, 2024

Katherine Kelly Vidal
*Director of the United States Patent and Trademark Office*